United States Patent
Miyagawa et al.

(10) Patent No.: US 8,731,541 B2
(45) Date of Patent: May 20, 2014

(54) FEMTO CELL BASE STATION, COMMUNICATION CONTROL APPARATUS, COMMUNICATION SYSTEM, CONTROL METHOD AND PROGRAM

(75) Inventors: Yusuke Miyagawa, Tokyo (JP); Takayuki Kido, Tokyo (JP); Takuo Akimoto, Tokyo (JP); Takeshi Nishimura, Tokyo (JP); Shunsuke Yokouchi, Tokyo (JP); Naoki Yoshida, Tokyo (JP); Yasuhiro Watanabe, Tokyo (JP); Hiroaki Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 273 days.

(21) Appl. No.: 13/140,852

(22) PCT Filed: Apr. 12, 2010

(86) PCT No.: PCT/JP2010/056515
§ 371 (c)(1),
(2), (4) Date: Jul. 21, 2011

(87) PCT Pub. No.: WO2010/119832
PCT Pub. Date: Oct. 21, 2010

(65) Prior Publication Data
US 2012/0021736 A1  Jan. 26, 2012

(30) Foreign Application Priority Data
Apr. 17, 2009  (JP) ................................. 2009-100603

(51) Int. Cl.
*H04W 4/00* (2009.01)

(52) U.S. Cl.
USPC ...................................................... 455/422.1

(58) Field of Classification Search
USPC ...................... 455/434, 411, 433, 458, 422.1; 370/328, 338, 252; 726/3
See application file for complete search history.

(56) References Cited

U.S. PATENT DOCUMENTS

| | | | |
|---|---|---|---|
| 2008/0076411 A1 | 3/2008 | Khetawat et al. | |
| 2009/0288145 A1* | 11/2009 | Huber et al. | 726/3 |
| 2009/0305699 A1* | 12/2009 | Deshpande et al. | 455/434 |
| 2010/0150133 A1 | 6/2010 | Witzel et al. | |

(Continued)

FOREIGN PATENT DOCUMENTS

| | | |
|---|---|---|
| JP | 2002-152376 A | 5/2002 |
| JP | 2008283648 A | 11/2008 |

(Continued)

OTHER PUBLICATIONS

Japanese Office Action for JP Application No. 2009-100603 mailed on Jul. 23, 2013 with Partial English Translation.

(Continued)

*Primary Examiner* — Melody Mehrpour
(74) *Attorney, Agent, or Firm* — Sughrue Mion, PLLC

(57) ABSTRACT

The femto cell base station is a femto cell base station that connects a UE (User Equipment) to a core network side and includes storing means and control means. The storing means retains subscriber information of the UE visiting an area under control of the femto cell base station. The control means deletes the subscriber information of the UE, that is removed from the control of the femto cell base station, from the storing means.

17 Claims, 14 Drawing Sheets

(56) References Cited

U.S. PATENT DOCUMENTS

| | | | |
|---|---|---|---|
| 2010/0195573 A1* | 8/2010 | Gupta et al. | 370/328 |
| 2010/0203865 A1* | 8/2010 | Horn et al. | 455/411 |
| 2011/0223887 A1* | 9/2011 | Rune et al. | 455/411 |

FOREIGN PATENT DOCUMENTS

| | | | |
|---|---|---|---|
| JP | 2008301086 A | 12/2008 | |
| JP | 2009504049 A | 1/2009 | |
| JP | 2009504051 A | 1/2009 | |
| WO | 2007082551 A1 | 7/2007 | |
| WO | 2008/136422 A1 | 11/2008 | |

OTHER PUBLICATIONS

International Search Report for PCT/JP2010/056515 mailed Jun. 15, 2010.

European search report for EP10764416.3 mailed on Sep. 26, 2012.

* cited by examiner

FEMTO CELL BASE STATION, COMMUNICATION CONTROL APPARATUS, COMMUNICATION SYSTEM, CONTROL METHOD AND PROGRAM

The present application is the National Phase of PCT/JP2010/056515, filed Apr. 12, 2010, which claims priority based on Japanese Patent Application No. 2009-100603, filed on Apr. 17, 2009, the disclosure of which is incorporated herein by reference in its entirety.

TECHNICAL FIELD

The present invention relates to a technique of carrying out communication using a femto cell base station.

BACKGROUND ART

In recent years, communication systems introducing a femto cell base station are being developed in order to improve the quality of communication areas.

A femto cell base station is a small radio base station that covers a small communication area having a radius on the order of several tens of meters, intended to be installed in a room such as a home or office and the covers the communication area in the room. This allows the communication quality of the communication area that cannot be covered by an existing macro cell base station to be improved. Furthermore, the femto cell base station also allows the communication area to be covered without increasing costs in construction and improvement of infrastructure of the macro cell base station.

A system have been developed so far such that a femto cell base station is installed in a room of a home, office or the like and only a specific subscriber user (UE: User Equipment) is connected to a core network side via the femto cell base station (femto network) (e.g., see Patent Literatures 1 and 2).

CITATION LIST

Patent Literature

Patent Literature 1: JP2009-504049A
Patent Literature 2: JP2009-504051A

SUMMARY OF INVENTION

Technical Problem

However, in recent years, it is considered necessary to install a plurality of femto cell base stations (FAP#1, FAP#2) in public facilities or the like as shown in FIG. 1 and to develop a system that allows not only a specific subscriber user (UE) but also an indefinite number of subscriber users (UE) to be connected to the core network side via the femto cell base stations (FAP#1, FAP#2).

When such a system shown in FIG. 1 is constructed, there can be a situation in which the subscriber user (UE) moves between the femto cell base stations (FAP#1, FAP#2).

For example, the subscriber user (UE) may move from a state in which the UE is visiting an area under control of a first femto cell base station (FAP#1) to an area under control of a second femto cell base station (FAP#2).

In this case, since the subscriber user (UE) visits the area under control of the second femto cell base station (FAP#2) after movement, the second femto cell base station (FAP#2) needs to manage subscriber information (CS/PS) of the subscriber user (UE). CS refers to Circuit Switching and PS refers to Packet Switching.

Furthermore, since the subscriber user (UE) ceases to visit the area under control of the first femto cell base station (FAP#1), the first femto cell base station (FAP#1) needs to release the subscriber information (CS/PS) of the subscriber user (UE).

Therefore, when a system is constructed in such a way that the subscriber user (UE) can move between the femto cell base stations (FAP#1, FAP#2), a mechanism is required to dynamically change the subscriber information (CS/PS) of the subscriber user (UE) managed by the femto cell base stations (FAP#1, FAP#2) according to the visiting position of the subscriber user (UE).

It is an object of the present invention to provide a technique of dynamically changing subscriber information of a UE managed by a femto cell base station according to a visiting position of the UE.

Solution to Problems

In order to attain the above described object, the present invention has the following features.

<Femto Cell Base Station>

The femto cell base station of the present invention is a femto cell base station that connects a UE (User Equipment) to a core network side, including storing means for retaining subscriber information of the UE visiting an area under control of the femto cell base station and control means for deleting the subscriber information of the UE, that is removed from the control of the femto cell base station, from the storing means.

<Communication Control Apparatus>

The communication control apparatus of the present invention is a communication control apparatus that carries out communication with a plurality of femto cell base stations that connect a UE (User Equipment) to a core network side, including managing means for managing a visiting state of the UE under control of the plurality of femto cell base stations and control means for performing, upon judging, based on the visiting state managed by the managing means, that the UE visiting an area under control of a first femto cell base station has moved to an area under control of a second femto cell base station, a processing operation for deleting subscriber information of the UE managed by the first femto cell base station.

<Control Method>

The control method according to the present invention is a control method carried out by a femto cell base station that connects a UE (User Equipment) to a core network side, retaining subscriber information of the UE visiting an area under control of the femto cell base station and deleting the subscriber information of the UE that is removed from the control of the femto cell base station.

Another control method according to the present invention is a control method carried out by a communication control apparatus that communicates with a plurality of femto cell base stations that connect a UE (User Equipment) to a core network side, managing a visiting state of the UE under control of the plurality of femto cell base stations and performing, upon judging, based on the managed visiting state, that the UE visiting an area under control of a first femto cell base station has moved to an area under control of a second femto cell base station, processing for deleting subscriber information of the UE managed by the first femto cell base station.

BRIEF DESCRIPTION OF DRAWINGS

FIG. 1 is a diagram illustrating a system configuration example of a communication system according to an exemplary embodiment.
FIG. 2 is a diagram illustrating 6-minute-period De-Register and 50-minute-period Re-Register.
FIG. 3 is a first diagram illustrating a processing operation when a UE moves from FAP#1 to FAP#2.
FIG. 4 is a second diagram illustrating a processing operation when the UE moves from FAP#1 to FAP#2.
FIG. 5 is a diagram illustrating a case that occurs when the UE moves between FAPs.
FIG. 6 is a diagram illustrating a processing operation when FAP#1, before movement has occurred, activates triggering of 6-minute-period De-Register transmission through radio communication monitoring (case S1).
FIG. 7 is a diagram illustrating a processing operation when the UE moves from a state in which the UE is visiting an area under control of FAP#1 to an area under control of FAP#2 and then returns to FAP#1 again (case S2).
FIG. 8 is a diagram illustrating a processing operation when FAP#1 activates triggering of 50-minute-period Re-Register transmission to the CSCF (case S3).
FIG. 9 is a diagram illustrating a processing operation when the UE moves to a Macro network in the state of case S3 in FIG. 8.
FIG. 10 is a diagram illustrating a processing operation when the UE turns power OFF/ON at FAP#2 in the state of case S3 in FIG. 8.
FIG. 11 is a diagram illustrating a processing operation when FAP#2 activates triggering of 50-minute-period Re-Register transmission to the CSCF in the state of case S3 in FIG. 8.
FIG. 12 is a diagram illustrating a processing operation when the UE carries out CS transmission (SMS transmission) in the case of case S3 in FIG. 8.
FIG. 13 is a diagram illustrating a processing operation when the UE moves to a Macro network (case S4).
FIG. 14 is a block diagram illustrating a schematic function configuration of the femto cell base station.
FIG. 15 is a block diagram illustrating a schematic function configuration of the communication control apparatus that communicates with the femto cell base station.

DESCRIPTION OF EMBODIMENTS

Figure 1:
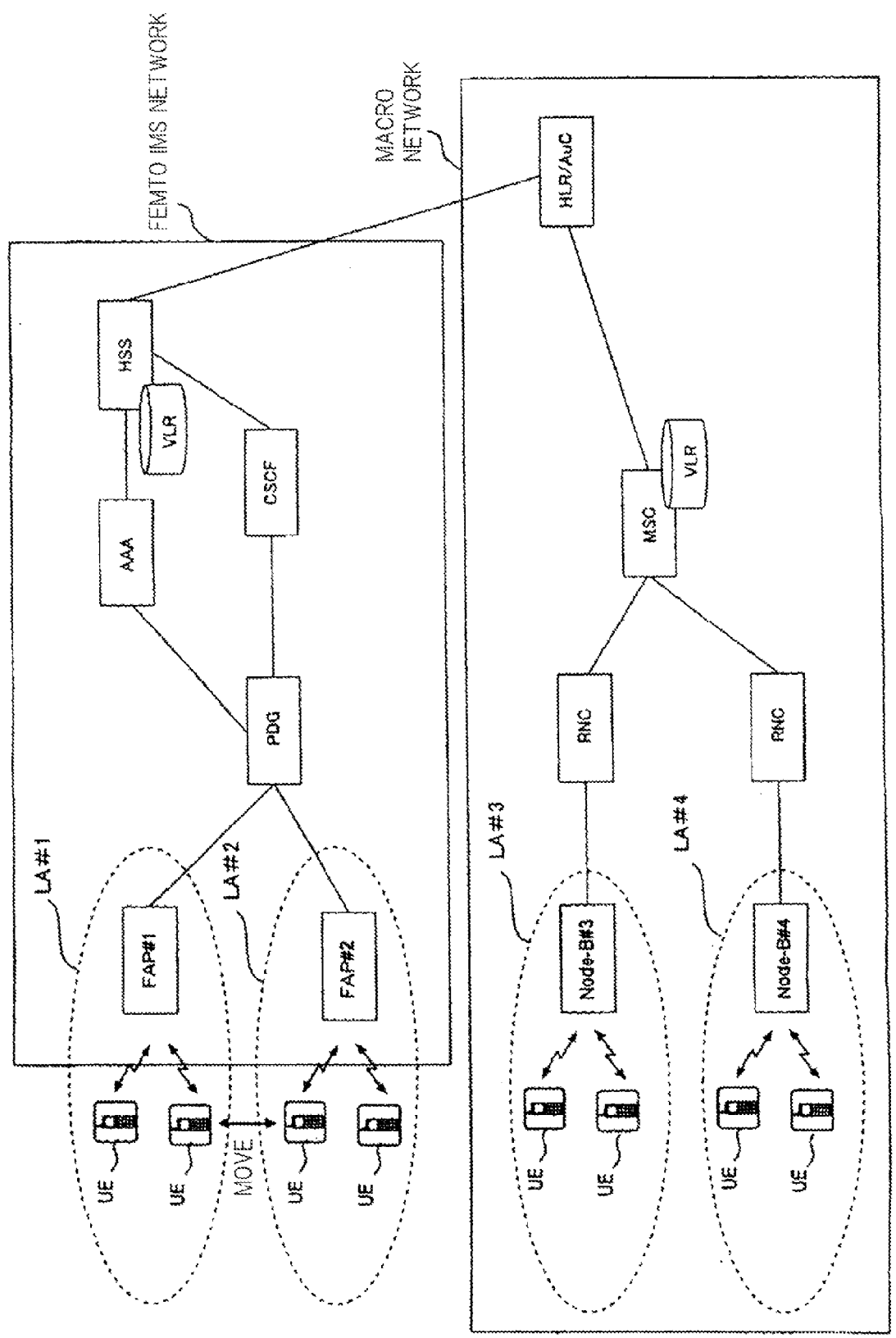
[FIG. 1]

<Overview of Communication System of Present Exemplary Embodiment>
First, an overview of a communication system of the present exemplary embodiment will be described with reference to FIG. 1.

The communication system according to the present exemplary embodiment is a communication system configured by including a UE (User Equipment), a plurality of femto cell base stations (FAP#1, FAP#2) that connect the UE to a core network side and a communication control apparatus (CSCF) that communicates with the femto cell base stations (FAP#1, FAP#2).

When the UE moves from a state in which the UE is visiting an area under control of a first femto cell base station (FAP#1) to a state in which the UE is visiting an area under control of a second femto cell base station (FAP#2), the communication control apparatus (CSCF) according to the present exemplary embodiment transmits a deletion request for deleting subscriber information of the UE managed by the first femto cell base station (FAP#1) to the first femto cell base station (FAP#1).

Upon receiving the deletion request from the communication control apparatus (CSCF) side, the first femto cell base station (FAP#1) deletes the subscriber information of the UE corresponding to the deletion request.

Furthermore, when there is a UE not visiting the area under control of the femto cell base station (FAP#1) in the subscriber information of UEs visiting the area under control of the femto cell base station (FAP#1), the femto cell base station (FAP#1) according to the present exemplary embodiment transmits a request for deleting the subscriber information of the UE to the communication control apparatus (CSCF). The communication control apparatus (CSCF) is configured by including managing means for managing the subscriber information of the UE in association with the femto cell base station (FAP), refers to, upon accepting the deletion request from the femto cell base station (FAP#1), the managing means and transmits, upon accepting a deletion request from the femto cell base station (FAP#1) that is different from the femto cell base station (FAP) managed by the managing means, a response indicating that the deletion request is accepted to the femto cell base station (FAP#I).

Upon accepting the deletion request from the communication control apparatus (CSCF), the femto cell base station (FAP#l) deletes the subscriber information of the UE.

This allows the communication system of the present exemplary embodiment to dynamically change the subscriber information of the subscriber user (UE) managed by the femto cell base stations (FAP#1, FAP#2) according to the visiting position of the subscriber user (UE). Hereinafter, the communication system of the present exemplary embodiment will be described with reference to the accompanying drawings.

<System Configuration Example of Communication System>

First, a system configuration example of the communication system of the present exemplary embodiment will be described with reference to FIG. 1.

The communication system of the present exemplary embodiment is configured by including a Macro network and a Femto IMS (IP Multimedia subsystem) network.

The Macro network is a publicly known existing 3G network. The Macro network is configured by including a UE (User Equipment), Node-B, RNG (Radio Network Controller), MSC (Mobile Services Switching Centre), VLR (Visitor Location Register) and HLR/AuC (Home Location Register/Authentication Centre).

The UE, Node-B, RNC, MSC, VLR and HLR/AuC making up the Macro network are apparatuses that carry out 3GPP-compliant processing, and therefore more specific descriptions of the processing operation will be omitted. Techniques used in the existing Macro network (communication system) are disclosed, for example, in 3GPP TS 33.234 V8.0.0 (2007-12).

The Femto IMS network is configured by including an FAP (Femto Access Point), PDG (Packet Data Gateway), AAA (Authentication Authorization Accounting), CSCF (Call Session Control Function), HSS (Home subscriber Server) and VLR (Visitor Location Register).

The FAP is a small radio base station that covers a small communication area having a radius on the order of several tens of meters.

The PDG is an apparatus that relays a message.

The CSCF is an apparatus that serves as a central node in an IMS network and performs functions such as session control using an SIP (Session Initiation Protocol), management, authentication and routing.

The AAA is an apparatus that carries out authentication processing between the UE and the network.

The HSS is an apparatus that manages subscriber information of the UE used in the IMS.

The VLR is an apparatus that stores subscriber information of the UE. The HSS acquires the subscriber information of the UE from the HLR/AuC and stores the acquired subscriber information of the UE in the VLR and manages the subscriber information.

The communication system of the present exemplary embodiment allows the plurality of FAP#1 and FAP#2 to be installed in public facilities or the like and allows not only a specific UE but also an indefinite number of UEs to be connected to the core network side via FAP#1 and FAP#2. Furthermore, since the communication system of the present exemplary embodiment arranges the plurality of FAP#1 and FAP#2, the UE can move between FAP#1 and FAP#2.

For example, the UE can move from a state in which the UE is visiting an area under control of FAP#1 to an area under control of FAP#2. In this case, since the UE visits the area under control of FAP#2, after movement has occurred, FAP#2 needs to manage the subscriber information (CS/PS) of the UE. Furthermore, since the UE ceases to visit the area under control of FAP#1 FAP#1 needs to release the subscriber information (CS/PS) of the UE.

Therefore, the communication system of the present exemplary embodiment dynamically changes the subscriber information (CS/PS) of the UE managed by FAP#1 and FAP#2 according to the visiting position of the UE.

Management of the subscriber information (CS/PS) of the UE by FAP#2 can be realized by the UE performing location registration processing of CS and location registration processing of PS together with the core network side.

Furthermore, release of the subscriber information (CS/PS) of the UE by FAP#1 can also be realized by transmitting SIP-De-Register to the CSCF on the core network side and by receiving SIP-200 OK from the CSCF.

Figure 2:
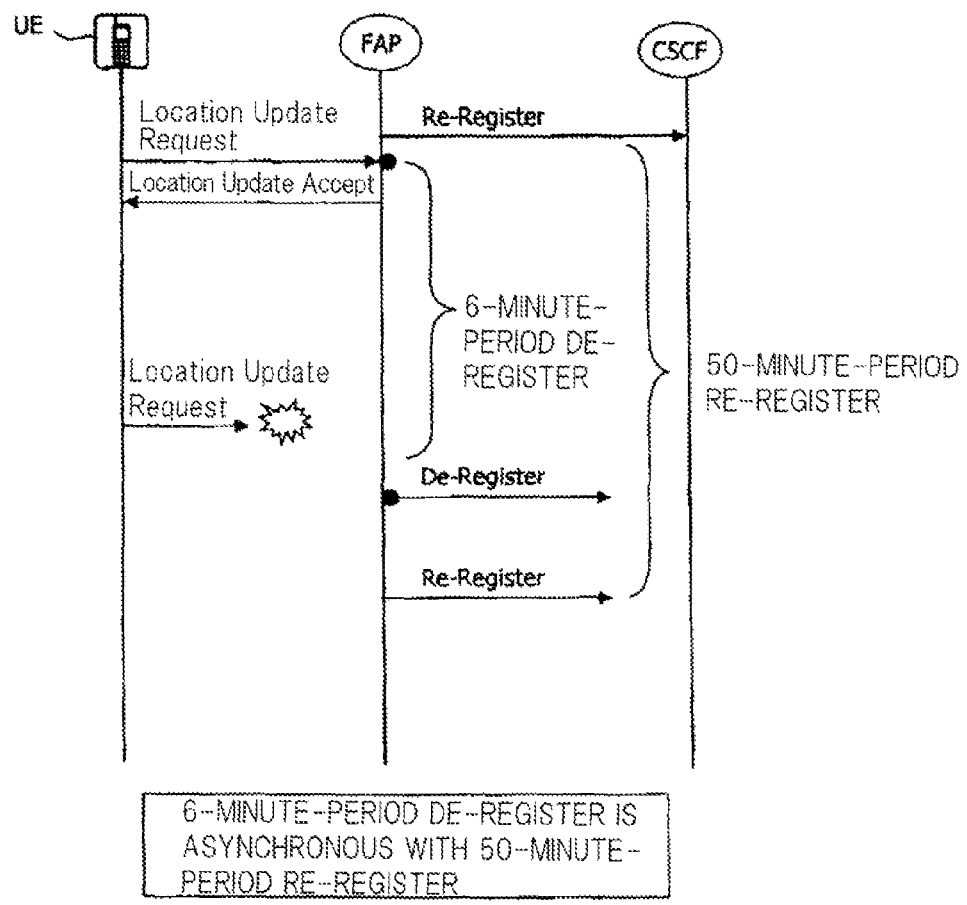
[FIG. 2]

In this case, the FAP monitors the UE visiting an area under control of the FAP based on the subscriber information of the UE managed by the FAP, and judges, when, for example, no Location Update Request can be received again from the UE until six minutes elapse after receiving Location Update Request from the UE, as shown in FIG. 2, that the UE is not visiting the area under control of the FAP, and transmits SIP-De-Register to the CSCF on the core network side and releases, when SIP-200 OK is received from the CSCF, the subscriber information (CS/PS) of the UE. This allows FAP#1 to release the subscriber information (CS/PS) of the UE that is not visiting the area under control of FAP#1. The period of Location Update Request transmitted to the FAP by the UE can be arbitrarily specified from the FAP. However, according to 3GPP TS 24.008 V8.1.0 (2008-3), a value less than six minutes cannot be set.

When 50 minutes elapse after transmitting SIP-Re-Register to the CSCF on the core network side while managing the subscriber information (CS/PS) of the UE, the FAP retransmits SIP-Re-Register and also performs a processing operation to maintain the connection between the FAP and CSCF. The FAP autonomously executes an aforementioned 6-minute-period De-Register and a 50-minute-period Re-Register.

However, in the present system in which the UE can move between the FAPs, if the FAP autonomously executes an aforementioned 6-minute-period De-Register and a 50-minute-period Re-Register, since a 6-minute-period De-Register is asynchronous with a 50-minute-period Re-Register, the CSCF on the core network side may erroneously recognize the FAP that the UE is visiting.

For example, after the UE moves from a state in which the UE is visiting the area under control of FAP#1 to the area under control of FAP#2, if FAP#1 transmits a 50-minute-period Re-Register to the CSCF and if the CSCF receives Re-Register, the CSCF judges that the UE has moved to the area under control of FAP#1 again. As a result, although the UE is actually visiting the area under control of FAP#2, the CSCF erroneously recognizes that the UE is visiting the area under control of FAP#1 and executes a processing operation corresponding to the case where the UE has moved to the area under control of FAP#1.

Furthermore, even if the FAP causes the aforementioned 6-minute-period De-Register to synchronize with the 50-minute-period Re-Register, since the FAP cannot set the period of De-Register to less than six minutes, the FAP cannot immediately detect that the UE has moved from the area under control of FAP#1 to the area under control of FAP#2, and the CSCF on the core network side may erroneously recognize the FAP that the UE is visiting.

For example, after the UE moves from a state in which the UE is visiting the area under control of FAP#1 to the area under control of FAP#2, if FAP#1 cannot receive Location Update Request from the UE again, FAP#1 transmits the De-Register to the CSCF on the core network side and releases subscriber information (CS/PS) of the UE upon receiving SIP-200 OK from the CSCF. However, since the De-Register period cannot be set to less than six minutes, the CSCF on the core network side may erroneously recognize the FAP that the UE is visiting for six minutes.

Therefore, the CSCF needs to recognize the FAP that the UE is visiting and change the subscriber information (CS/PS) of the UE managed by the FAP.

In order to solve the above described problems, in the communication system of the present exemplary embodiment, when the UE moves from a state in which the UE is visiting an area under control of FAP#1 to a visiting area under control of FAP#2, the CSCF transmits SIP-NOTIFY to FAP#1, before movement has occurred, and releases the subscriber information (CS/PS) of the UE managed by the FAP#1, before movement has occurred. This allows the CSCF to change the subscriber information (CS/PS) of the UE managed by the FAP according to the visiting position of the UE and allows FAP#1, before movement has occurred, to release the subscriber information (CS/PS) of the UE. As a result, the CSCF can avoid misrecognition of the FAP that the UE is visiting. Hereinafter, a more specific processing operation will be described in detail. In the following processing operation, the processing operation, when the UE moves from FAP#1 to FAP#2, will be described.

<Processing Operation When UE Moves From FAP#1 to FAP#2>

Next, the processing operation when the UE moves from FAP#1 to FAP#2 will be described with reference to FIG. 3 and FIG. 4.

In the following description, suppose IPsec Tunnel (ZAP#1 Tunnel) is established between FAP#1 and the PDG (step A1) and IPsec Tunnel (ZAP#2 Tunnel) is established between FAP#2 and the PDG (step A2).

Furthermore, since the UE is visiting an area under control of FAP#1, suppose the UE, FAP#1 and CSCF are connected (step A3). Therefore, FAP#1 is managing the subscriber information (CS/PS) of the UE (step A4). Furthermore, the CSCF and VLR of HSS are managing the subscriber information (CS) of the UE (steps A5 and A6). The subscriber information of the UE is managed in association with the information (IMSI.FAP#1) of FAP#1. IMSI.FAP#1 is information for identifying FAP#1.

When the UE moves to LA (Location Area) (LA#2) under control of FAP#2 (new) that is different from FAP#1 (old) of the last location registration, the UE starts registering the location of a CS service (initial location registration) and the UE transmits Location Update Request to FAP#2 (step A7).

Upon accepting Location Update Request, if the UE corresponds to a user who is accepted on the core network side, FAP#2 transmits an IKE-SA-INIT Request to the PDG (step A8). An IKE-SA-INIT is Internet Key Exchange-Security Authentication-INITialise.

Upon receiving an IKE-SA-INIT Request, the PDG transmits an IKE-SA-INT Response to FAP#2 (step A9).

Upon receiving an IKE-SA-INI Response, FAP#2 establishes IKE SA between FAP#2 and PDG and transmits an IKE-AUTH Request to the PDG (step A10). FAP#2 transmits APN (Access Point Name) and NAI (Network Access Identifier) included in the IKE-AUTH Request. IKE-AUTH is Internet Key Exchange-AUTHentication. APN is information for identifying a link point of the network. NAI is information for identifying network access.

Since FAP#2 has received Location Update Request from the UE, FAP#2 judges location registration of a CS service and transmits NAI of "OCSO<UE#IMSI>/<Femto#IMSI>@realmname." "OCSO" is information meaning location registration of the CS service. "<UE#IMSI>" is information for identifying the UE and IMSI.UE included in a message accepted from the UE. "<Femto#IMSI>" is information for identifying FAP#2.

Upon receiving an IKE-AUTH Request, the PDG transmits a Dia-EAP-Request to the AAA (step A11). The PDG transmits NAI included in an IKE-AUTH Request, included in the Dia-EAP-Request. Dia-EAP is Diameter-Extensible Authentication Protocol.

Upon receiving the Dia-EAP-Request, the AAA judges based on NAI included in the Dia-EAP-Request whether the Dia-EAP-Request is location registration of a CS service or location registration of a PS service or PDP Activate. Upon judging that it is location registration of a CS service, the AAA transmits the Dia-Wx-MAR to the HSS (step A12). The Dia-Wx-MAR is Diameter?Wx?Multimedia Authentication Request. Since NAI is "OCSO<UE#IMSI>/<Femto#IMSI>@realmname," the AAA judges that it is location registration of a CS service and transmits IMSI.UE of NAI included in the Dia-EAP-Request, included in the Dia-Wx-MAR.

Upon receiving the Dia-Wx-MAR, the HSS transmits MAP-SAI invocation[CS] to the HLR/AuC (step A13). MAP-SAL is MAP-Send Authentication Information. [CS] means Circuit Switching. The HSS transmits IMSI.UE included in Dia-Wx-MAR, included in MAP-SAI invocation [CS].

Upon receiving the MAP-SAI invocation[CS], the HLR/AuC transmits MAP-SAI Ack to the HSS (step A14). The HLR/AuC acquires RAND/AUTN/CK/IK/XRES corresponding to IMSI.UE included in the MAP-SA1 invocation [CS] and transmits acquired RAND/AUTN/CK/IK/XRES included in MAP-SA1 Ack (step A14).

RAND/AUTN/CK/IK/XRES is 3GPP-compliant information. RAND is Random challenge, AUTN is Authentication Token, CK is Cipher Key, IK is Integrity Key and XRES is Expected RESponse.

In the present processing operation, suppose the HLR/AuC transmits RAND/AUTN/CK/IK/XRES included in the MAP-SAI Ack (EAP-AKA authentication). However, RAND/AUTN/KC/RES may also be transmitted included in the MAP-SAI Ack (EAP-SIM authentication). EAP-AKA authentication (UMTS authentication) and EAP-SIM authentication (GSM authentication) are selected by the HLR/Auc according to the capacity of NW contracted by the UE.

Upon receiving the MAP-SAI Ack, the HSS transmits the Dia-Wx-MAA to the AAA (step A15). Dia-Wx-MAA is a Diameter?Wx?Multimedia Authentication Answer. The HSS transmits RAND/AUTN/GK/IK/XRES included in the MAP-SAI Ack, included in the Dia-Wx-MAA.

Upon receiving the Dia-Wx-MAA, the AAA transmits the Dia-EAP-Answer to the PDG (step A16). The AAA transmits RAND/AUTN/CK/IK included in Dia-Wx-MAA, included in Dia-EAP-Answer.

Upon receiving a Dia-EAP-Answer, the PDG transmits an IKE-AUTH Response to FAP#2 (step A17). The PDG transmits an EAP-Request/AKA-Challenge and RAND/AUTN/CK/IK included in the Dia-EAP-Answer, included the IKE-AUTH Response. AKA is an Authentication and Key Agreement.

Upon receiving the IKE-AUTH Response, FAP#2 transmits an Authentication Request to the UE (step A18). FAP#2 transmits RAND/AUTN included in the IKE-AUTH Response, included in the Authentication Request.

Upon receiving an Authentication Request, the UE carries out authentication operation based on RAND/AUTN included in Authentication Request. The authentication operation is carried out using a 3GPP-compliant method.

The UE calculates RES and transmits calculated RES included in the Authentication Response to FAP#2 (step A19). RES is calculated using a 3GPP-compliant method.

Upon receiving the Authentication Response, FAP#2 transmits an IKE-AUTH Request to the PDG (step A20). FAP#2 transmits the EAP-Response/AKA-Challenge and RES included in Authentication Response, included in the IKE-AUTH Request.

Upon receiving the IKE-AUTH Request, the PDG transmits a Dia-EAP-Request to the AAA (step A21). The PDG calculates MAC (Message Authentication Code) and transmits RES and MAC included in the Dia-EAP-Request. The MAC is calculated using a 3GPP-compliant method.

Upon receiving a Dia-EAP-Request, the AAA performs UE authentication. UE authentication is performed using a 3GPP-compliant method. When UE authentication has been performed successfully, the AAA transmits a Dia-EAP-Answer to the PDG (step A22). The AAA transmits EAP-Success included in the Dia-EAP-Answer.

Upon receiving Dia-EAP-Answer, the PDG transmits an IKE-AUTH Response to FAP#2 (step A23). The PDG transmits EAP-Success included in the IKE-AUTH Response.

Upon receiving the IKE-AUTH Response, FAP#2 transmits a SIP-Register to the CSCF (step A24). FAP#2 transmits IMSI.UE included in the SIP-Register to the CSCF.

Upon receiving the SIP-Register, the CSCF judges that the SIP-Register with Call ID (FAP#2) that is different from Call ID (FAP#1) of the subscriber information of the UE (Register information of FAP#1) managed in its own CSCF has been received. In this case, the CSCF judges that the UE has moved between the visiting areas of FAPs and transmits Dia-Cx-SAR to the HSS (step A25). The SAR is a Server-Assignment-Request. The CSCF transmits IMSI.UE included in the Dia-Cx-SAR.

Upon receiving the Dia-Cx-SAR, the HSS transmits a MAP-Update Location invocation[CS] to the HLR/AuC (step A26). The HSS transmits IMSI.UE included in the MAP-Update Location invocation.

Upon receiving the MAP-Update Location invocation, the HLR/AuC transmits a MAP-Insert Subscriber Data invocation to the HSS (step A27). The HLR/AuC transmits subscriber information that is included in the MAP-Insert Subscriber Data invocation.

Upon receiving a MAP-Insert Subscriber Data invocation, the HSS creates subscriber information of the UE based on the subscriber information included in the MAP-Insert Subscriber Data invocation. The HSS registers the subscriber information of the UE with the VLR and manages the subscriber information (CS) of the UE through the VLR. In this case, the HSS manages the subscriber information (CS) of the UE in association with information of FAP#2 (IMSI.FAP#2) through the VLR. Thus, the HSS overwrites the subscriber information (CS) of the UE managed by the VLR and manages the subscriber information (CS) of the UE in association with FAP#2, after movement has occurred, instead of FAP#1, before movement has occurred (step A42).

Next, the HSS transmits MAP-Insert Subscriber Data Ack to the HLR/AuC (step A28).

Upon receiving a MAP-Insert Subscriber Data Ack, the HRL/AuC transmits a MAP-Update Location Ack to the HSS (step A29).

Upon receiving the MAP-Update Location Ack, the HSS transmits a Dia-Cx-SAA to the CSCF (step A30). The SAA is a Server-Assignment-Answer. The HSS transmits MSISDN included in the Dia-Cx-SAA.

Upon receiving the Dia-Cx-SAA, the CSCF transmits a SIP-200 OK including MSISDN to FAP#2 (step A31). Furthermore, the CSCF manages information on the SIP-Register received from FAP#2, after movement has occurred, in association with the subscriber information (CS) of the UE. Thus, the CSCF manages the subscriber information (CS) of the UE in association with FAP#2 after movement (step A41).

Upon receiving a SIP-200 OK, FAP#2 transmits Security Mode Command to the UE (step A32).

Upon receiving Security Mode Command, the UE performs concealment. Concealment processing is performed using a 3GPP-compliant method. The UE then transmits Security Mode Complete to FAP#2 (step A33).

Upon receiving Security Mode Complete, FAP#2 seizes TMSI (Temporary Mobile Subscriber Identities). Seizing of TMSI is performed using a 3GPP-compliant method.

FAP#2 transmits Location Update Accept to the UE (step A34). FAP#2 transmits new TMSI included in Location Update Accept.

Upon receiving Location Update Accept, the UE acquires new TMSI generated by FAP#2 and transmits TMSI Reallocation Complete to FAP#2 (step A35).

Upon receiving the TMSI Reallocation Complete, FAP#2 manages IMSI.UE of the UE in association with new TMSI. Thus, FAP#2 manages subscriber information (CS) of the UE (step A39).

Furthermore, upon receiving the Dia-Cx-SAA, the CSCF transmits a SIP-NOTIFY to FAP#1 before movement of the UE (step A36). The CSCF sets state="terminated", event="deactivated" or the like in a Contact tag of the Body section of SIP-NOTIFY to convert it to a message meaning De-Register. Furthermore, a SIP-NOTIFY transmitted to FAP#1 is made to have the same format as that of SIP-NOTIFY transmitted to the FAP when a Diameter-RTR (Registration-Termination-Request) is received from the HSS. The processing operation of a SIP-NOTIFY transmitted to the FAP when Diameter-RTR (Registration-Termination-Request) is received from the HSS will be described later (e.g., see FIG. 9 and FIG. 13).

Upon receiving the SIP-NOTIFY, FAP#1 transmits a SIP-200 OK to the CSCF (step A37). Furthermore, FAP#1 deletes subscriber information (CS/PS) of the UE and releases the subscriber information (CS/PS) of the UE (step A40).

Thus, in the communication system of the present exemplary embodiment, when the UE moves from a state in which the UE is visiting the area under control of FAP#1 to a state in which the UE is visiting the area under control of FAP#2, the UE, FAP#2 and CSCF are connected (step A38), FAP#2 manages the subscriber information (CS) of the UE (step A39) and FAP#1 releases the subscriber information (CS/PS) of the UE (step A40). Furthermore, the CSCF and VLR of the HSS manage the subscriber information (CS) of the UE in association with information of FAP#2 (IMSI, FAP#2) (steps A41 and A42).

Next, when the UE performs location registration of a PS service, the UE transmits a Routing Area Update request to FAP#2 (step A43), performs substantially the same processing as that of location registration of the aforementioned CS service and performs location registration of the PS service (steps A44 to A64). Thus, FAP#2 manages the subscriber information (CS/PS) of the UE (step A64).

Thus, in the communication system of the present exemplary embodiment, when the UE which is an authorized user moves to an area in LA (Location Area) under control of FAP#2 (new) that is different from FAP#1 (old) of the last location registration (LA#2 shown in FIG. 1), the UE passes through White List of FAP#2, is accepted on the core network side, and a message is transmitted/received between the UE, FAP#2, PDG, AAA, HSS and HLR/AuC, authentication processing on the UE is performed, and when authentication on the UE has been performed successfully, a message is transmitted/received between FAP#2, PDG, CSCF, HSS and HLR/AuC, and the CSCF manages the subscriber information (CS) of the UE in association with the information on FAP#2 (step A41). Furthermore, the subscriber information (CS) of the UE managed by the VLR of the HSS is updated and the subscriber information (CS) of the UE is managed in association with the information on FAP#2 (step A42). Furthermore, the subscriber information (CS/PS) of the UE managed by FAP#1 is released (step A40) and the subscriber information (CS) of the UE is registered with FAP#2 and managed (step A39). Furthermore, when the UE performs location registration of a PS service, FAP#2 manages the subscriber information (CS/PS) of the UE (step A64).

Upon receiving the SIP-Register from FAP#2 after movement, the CSCF of the present exemplary embodiment receives the SIP-Register with Call ID (FAP#2) the different from Call ID (FAP#1) of the subscriber information of the UE (Register information of FAP#1) managed in its own CSCF, and therefore the CSCF judges that the UE is moving between the visiting areas of FAPs. Upon receiving the Dia-Cx-SA.A from. the HSS, the CSCF transmits a SIP-NOTIFY meaning De-Register to FAP#1, before movement has occurred, and deletes and releases the subscriber information (CS/PS) of the UE managed by FAP#1, before movement has occurred.

Thus, when the UE moves from a state in which the UE is visiting an area under control of FAP#1 to a visiting area under control of FAP#2, the CSCF of the present exemplary embodiment transmits a SIP-NOTIFY to FAP#1, before movement has occurred, and can release the subscriber information (CS/PS) of the UE managed by FAP#1, before movement has occurred. The CSCF of the present exemplary embodiment changes the subscriber information (CS/PS) of the UE managed by FAP#1, FAP#2 according to the visiting position of the UE and FAP#1, before movement has occurred, can release the subscriber information (CS/PS) of the UE, and a situation can thereby be avoided in which FAP#1 transmits a 50-minute-period Re-Register to the CSCF. As a result, the CSCF can avoid misrecognition of the FAP that the UE is visiting.

<If CSCF Does Not Transmit SIP-NOTIFY to FAP#1, Before Movement Has Occurred>

Next, a case where the CSCF does not transmit SIP-NOTIFY to FAP#1, before movement has occurred, and docs not release the subscriber information (CS/PS) of the UE managed by FAP#1 will be described.

Figure 5:
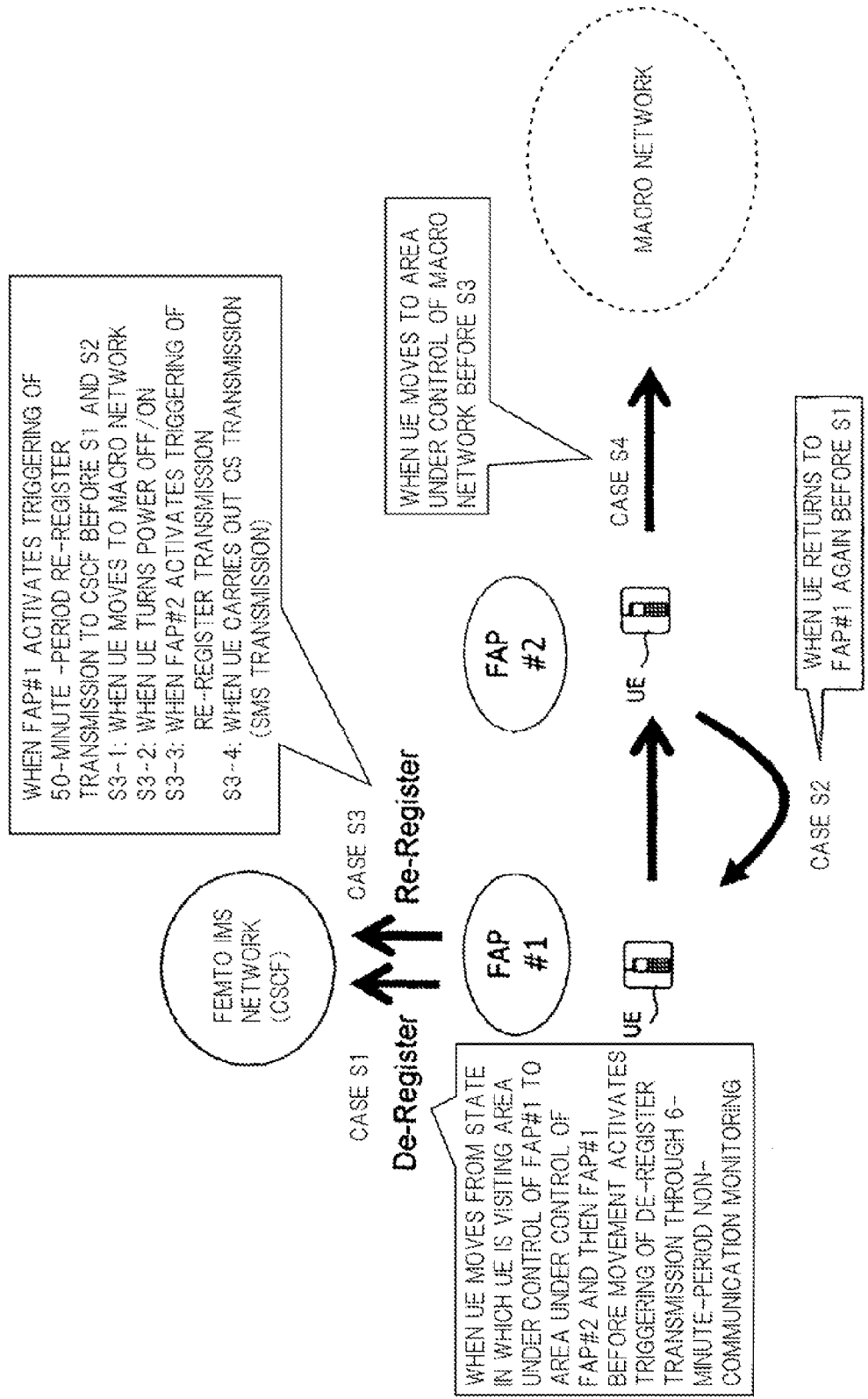
[FIG. 5]

Cases S1 to S4 shown in FIG. 5 may be considered as cases that occur when the UE moves between FAPs in the communication system of the present exemplary embodiment.

Case S1: When UE moves from a state in which the UE is visiting an area under control of FAP#1 to an area under control of FAP#2 and then FAP#1, before movement has occurred, activates triggering of De-Register transmission through non-communication monitoring for a 6-minute period Case S2: When UE moves from a state in which the UE is visiting an area under control of FAP#1 to an area under control of FAP#2 and then returns to FAP#1 again Case S3: After UE moves from a state in which UE is visiting an area under control of FAP#1 to an area under control of FAP#2, FAP#1 activates triggering of a 50-minute-period Re-Register transmission to CSCF before cases S1 and S2 occur. However, in this case, the following four cases further occur.

Case S3-1: When UE moves to Macro network
Case S3-2: When UE turns power OFF/ON at FAP#2
Case S3-3: When FAP#2 activates triggering of a 50-minute-period Re-Register transmission to CSCF
Case S3-4: When UE performs CS transmission (SMS transmission)
Case S4: After the UE moves from state in which the UE is visiting an area under control of FAP#1 to an area under control of FAP#2, UE moves to Macro network before cases S1 to S3 occur Hereinafter, case S1 to case S4 above will be described in detail.

<Case S1: When the UE moves from state in which the UE is visiting an area under control of FAP#1 to an area under control of FAP#2 and FAP#1, before movement occurs, then activates triggering of a De-Register transmission through non-communication monitoring for 6-minute period>

Figure 6:
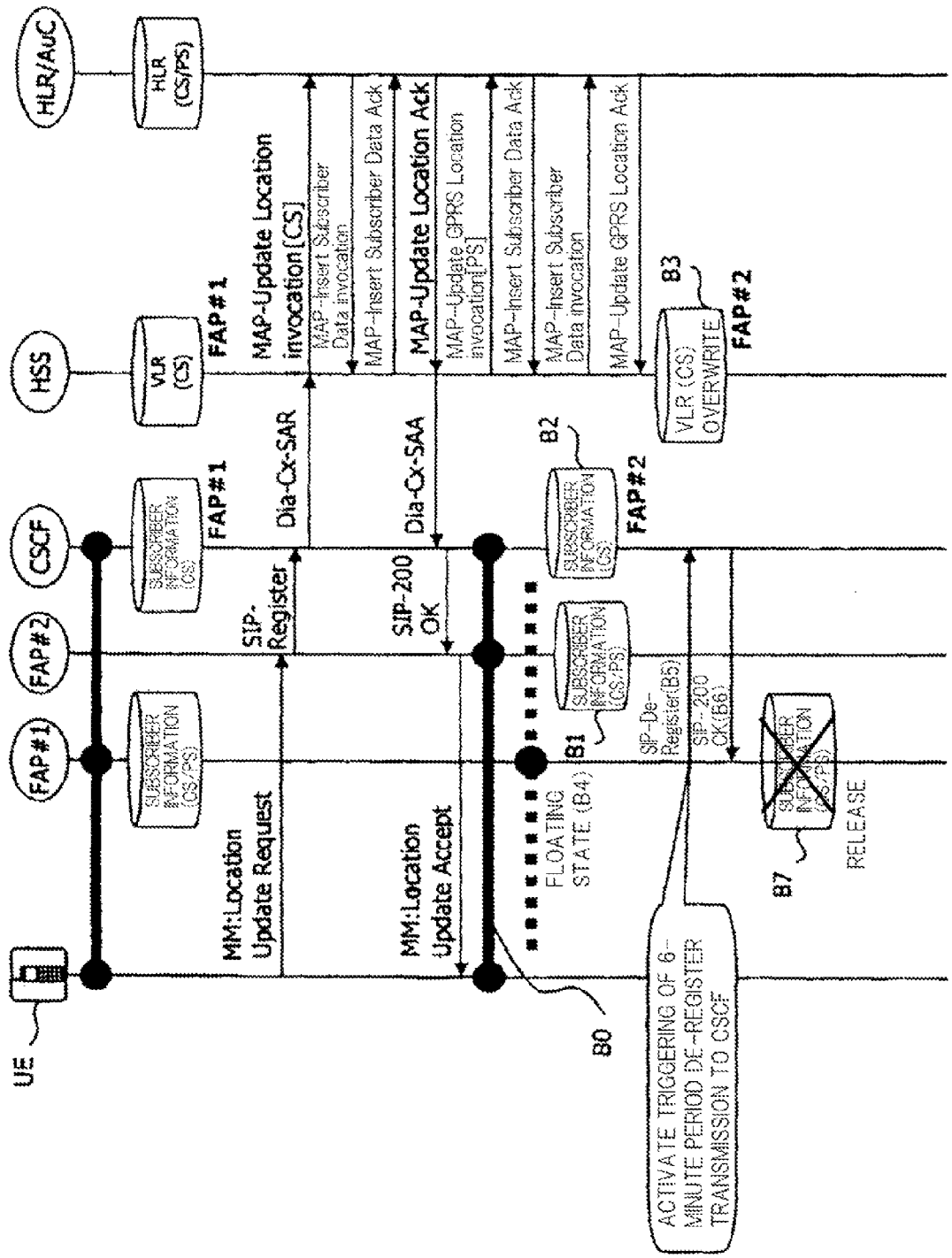
[FIG. 6]

First, a case where FAP#1, before movement has occurred, activates triggering of a Dc-Register transmission through non-communication monitoring for a 6-minute period will be described with reference to FIG. 6. In this case, FAP#1 transmits a SIP-De-Register to the CSCF and releases the subscriber information (CS/PS) of the UE upon receiving a SIP-200 OK from the CSCF.

When the UE visits the area under control of FAP#2 in a state in which the UE is visiting the area under control of FAP#1, the UE, FAP#2 and CSCF are connected (step B0). In this case, FAP#2 manages the subscriber information (CS/PS) of the UE (step B1). Furthermore, the CSCF manages the subscriber information (CS) of the UE in association with the information of FAP#2 (IMSI.FAP#2) (step B2). Furthermore, the VLR of the HSS manages the subscriber information (CS) of the UE in association with the information of FAP#2 (IMSI.FAP#2) (step B3). When the CSCF did not transmit a SIP-NOTIFY to FAP#1, before movement has occurred, the subscriber information (CS/PS) of the UE managed by FAP#1 cannot be released and the subscriber information (CS/PS) of the UE is left floating (step B4).

When FAP#1 judges in this state that the UE is not visiting the area under control of FAP#1 through non-communication monitoring for a 6-minute period, FAP#1 activates triggering of De-Register through non-communication monitoring for a 6-minute period and transmits a SIP-De-Register to the CSCF (step B5).

Upon receiving the SIP-De-Register, the CSCF refers to the subscriber information (CS) of the UE managed by the CSCF and judges that the SIP-De-Register with Call ID (FAP#1) that is different from Call ID (FAP#2) of subscriber information of the UE (Register information of FA#2) managed in its own CSCF has been received. In this case, the CSCF transmits a SIP-200 OK to FAP#1 while retaining the subscriber information of the UE (Register information of FAP#2) managed in the own CSCF (step B6). The CSCF judges that the Register received from the FAP is a De-Register when an Expire header of the Register received from the FAP is 0 or an Expires parameter value of a Contact header is 0.

Upon receiving the SIP-200 OK, FAP#1 deletes the subscriber information (CS/PS) of the UE and releases the subscriber information (CS/PS) of the UE (step B7).

Thus, in the communication system of the present exemplary embodiment, when FAP#1 judges through non-communication monitoring for a 6-minute period that the UE is not visiting, FAP#1 transmits a SIP-De-Register to the CSCF and releases the subscriber information (CS/PS) of the UE upon receiving a SIP-200 OK from the CSCF. Therefore, in this case S1, even if the CSCF does not transmit a SIP-NOTIFY to FAP#1, before movement has occurred, and even if the subscriber information (CS/PS) of the UE managed by FAP#1, before movement has occurred, is left floating, carrying out the aforementioned processing operation allows the subscriber information (CS/PS) of the UE managed by FAP#1, before movement has occurred, to be released without any problem.

<Case S2: When UE moves from a state in which UE is visiting an area under control of FAP#1 to an area under control of FAP#2 and then returns to FAP#1 again>

Figure 7:
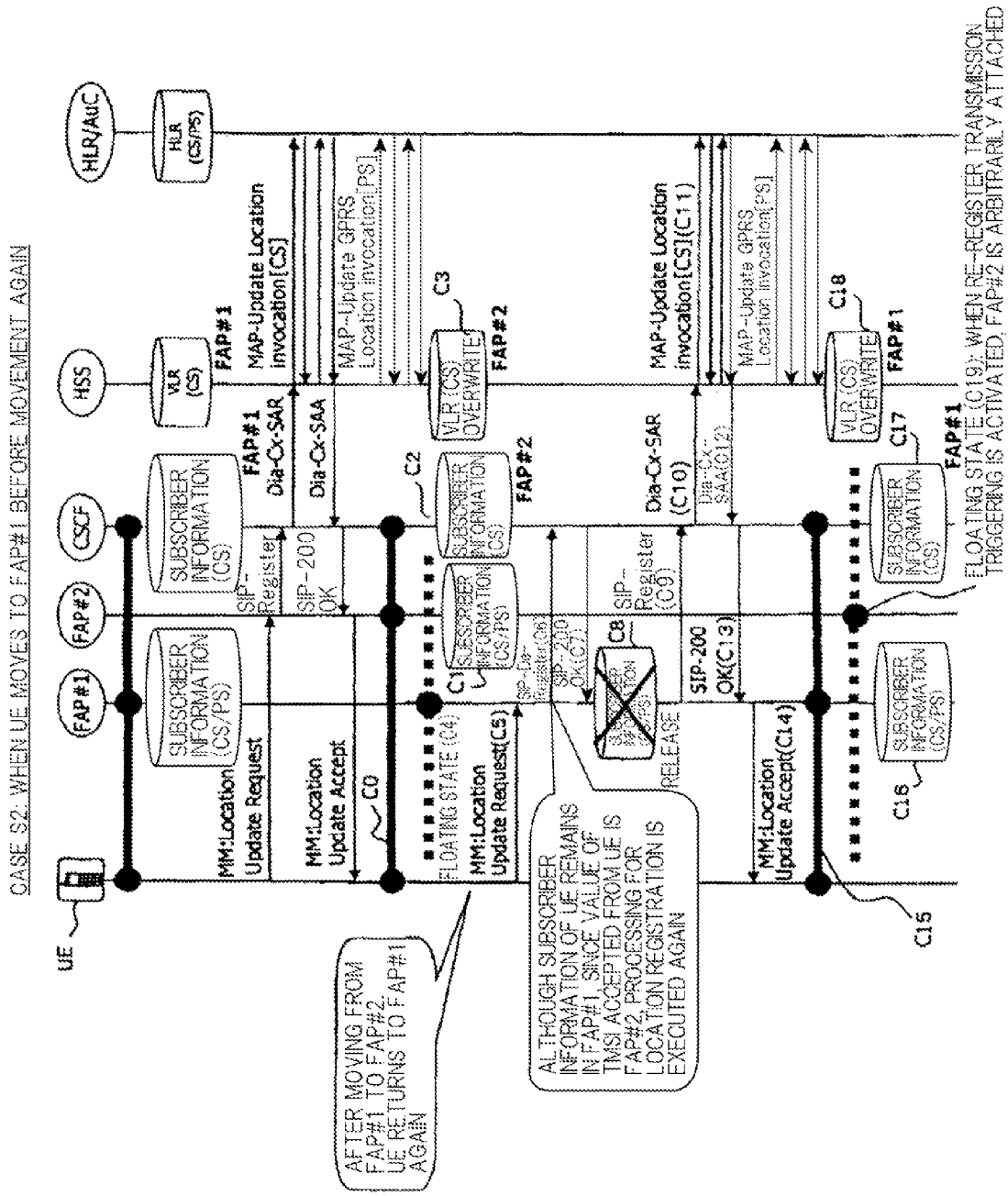
[FIG. 7]

Next, a case where the UE moves from a state in which the UE is visiting an area under control of FAP#1 to the area under control of FAP#2 and then returns to FAP#1 again will be described with reference to FIG. 7.

When the UE visits the area under control of FAP#2 from a state in which the UE is visiting the area under control of FAP#1, the UE, FAP#2 and CSCF are connected (step C0). In this case, FAP#2 manages the subscriber information (CS/PS) of the UE (step C1). Furthermore, the CSCF manages the subscriber information (CS) of the UE in association with the information of FAP#2 (IMSI.FAP#2) (step C2). Furthermore, the VLR of the HSS manages the subscriber information (CS) of the UE in association with the information of FAP#2 (IMSI.FAP#2) (step C3). When the CSCF did not transmit a SIP-NOTIFY to FAP#1 before movement occurs, the subscriber information (CS/PS) of the UE managed by FAP#1 cannot he released and the subscriber information (CS/PS) of the UE is left floating (step C4).

When the UE returns to the area under control of FAP#1, the UE transmits a Location Update Request to FAP#1 (step C5).

Upon receiving a Location Update Request, since the value of TMSI received from the UE is FAP#2, before movement has occurred, FAP#1 transmits SIP-De-Register to the CSCF (step C6).

Upon receiving the SIP-De-Register, the CSCF refers to the subscriber information (CS) of the UE managed by the CSCF, judges that the STP-De-Register with Call ID (FAP#1) that is different from Call ID (FAP#2) of the subscriber information of the UE (Register information of FAP#2) managed in its own CSCF has been received, and the CSCF transmits a SIP-200 OK to FAP#1 while retaining the subscriber information of the UE (Register information of FAP#2) in its own CSCF (step C7).

Upon receiving the SIP-200 OK, FAP#1 releases the subscriber information (CS) of the UE (step C8) and transmits a SIP-Register to the CSCF (step C9). Upon receiving the SIP-Register, the CSCF performs processing in C10 to C14 between the UE, FAP#1, CSCF, HSS and HLR/AuC, gives TMSI of new FAP#1 to the UE and connects between the UE, FAP#1 and CSCF (step C15).

Thus, FAP#1 newly manages the subscriber information (CS/PS) of the UE (step C16). Furthermore, the CSCF and VLR of the HSS manage the subscriber information (CS) of the UE in association with the information of FAP#1 (IMSI.FAP#1) (steps C17 and C18).

In this case S2, the subscriber information (CS/PS) of the UE managed by FAP#2 cannot be released and the subscriber information (CS/PS) of the UE is left floating (step C19). As a result, when FAP#2 activates triggering of a 50-minute-period Re-Register transmission to the CSCF, FAP#2 transmits the SIP-Re-Register to the CSCF and is connected to the CSCF. Thus, in case S2, the CSCF transmits a SIP-NOTIFY to FAP#1, before movement has occurred, releases the subscriber information (CS/PS) of the UE managed by FAP#1, before movement has occurred, avoids the occurrence of a floating state of FAP#1 in step C4, and can thereby avoid the aforementioned problem.

<Case S3: After UE moves from state in which the UE is visiting an area under control of FAP#1 to an area under control of FAP#2, FAP#1 activates triggering of a 50-minute-period Re-Register transmission to CSCF before cases S1 and S2 occur>

Next, a case will be described with reference to FIG. 8 where after the UE moves from a state in which the UE is visiting the area under control of FAP#1 to the area under control of FAP#2, FAP#1 activates triggering of a 50-minute-period Re-Register transmission to the CSCF before cases S1 and S2 occur.

When the UE visits the area under control of FAP#2 from a state in which the UE is visiting the area under control of FAP#1, the UE, FAP#2 and CSCF are connected (step D0). In this case, when the CSCF did not transmit a SIP-NOTIFY to FAP#1, before movement occurred, the subscriber information (CS/PS) of the UE managed by FAP#1 cannot be released and the subscriber information (CS/PS) of the UE is left floating (step D1).

When FAP#1 activates triggering of a 50-minute-period Re-Register transmission to the CSCF, FAP#1 transmits a SIP-Re-Register to the CSCF (step D2).

Upon receiving a SIP-Re-Register, the CSCF performs processing in steps D3 to D6 between FAP#1, CSCF, HSS and HLR/AuC, and FAP#1 and CSCF are connected (step D7). Furthermore, FAP#2 is not connected to the CSCF but is connected to the UE (step D8). Furthermore, the VLR of the HSS manages the subscriber information (CS) of the UE in association with FAP#1 (step D9). Suppose the state of steps D7 to D9 is A.

Furthermore, when FAP#1 activates triggering of a De-Register transmission through non-communication monitoring for a 6-minute period in the state of A, FAP#1 transmits a SIP-De-Register to the CSCF (step D10).

Upon receiving the SIP-De-Register, the CSCF performs processing in steps D11 to D14 between FAP#1, CSCF, HSS and HLR/AuC, and releases the connection between FAP#1 and CSCF. Furthermore, FAP#2 is not connected to the CSCF but is connected to the UE (step D15). Furthermore, FAP#2 deletes the subscriber information of the UE managed by the VLR of the HSS (step D16). Suppose the state of steps D15 to D16 is B.

In this case S3, FAP#1 activates triggering of a 50-minute-period Re-Register transmission to the CSCF and if FAP#1 transmits a SIP-Re-Register to the CSCF in step D2, the CSCF erroneously recognizes that the UE has moved to the area under control of FAP#1 although the UE is visiting the area under control of FAP#2. In this case S3, the following four cases further occur.

Case S3-1: When the UE moves to Macro network
Case S3-2: When the UE turns power OFF/ON at FAP#2
Case S3-3: When FAP#2 activates triggering of a 50-minute-period Re-Register transmission to CSCF
Case S3-4: When the UE carries out a CS transmission (SMS transmission)

<Case S3-1: When the UE moves to a Macro network in the state of case S3>

Figure 9:
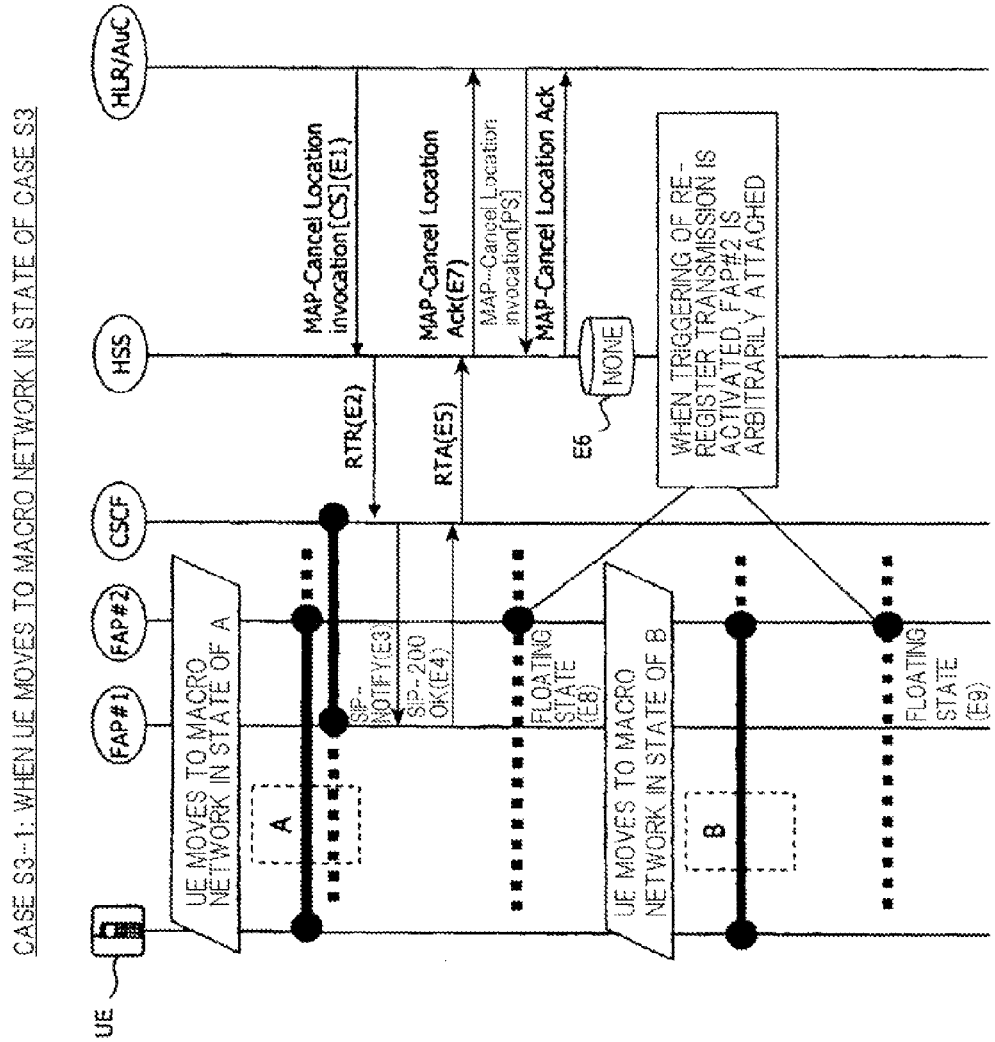
[FIG. 9]

First, the case where the UE moves to a Macro network in the state of case S3 will be described with reference to FIG. 9.

When the UE moves to the Macro network in the state of A, the HLR/AuC transmits a MAP-Cancel Location invocation [CS] to the HSS (step E1). Upon receiving the MAP-Cancel Location invocation[CS], the HSS transmits an RTR (Registration-Termination-Request) to the CSCF (step E2).

Upon receiving the RTR, the CSCF transmits a SIP-NOTIFY to FAP#1 (step E3).

Upon receiving the SIP-NOTIFY, FAP#1 deletes the subscriber information (CS) of the UE, releases the connection to the CSCF and transmits a SIP-200 OK to the CSCF (step E4).

Upon receiving the SIP-200 OK, the CSCF transmits an RTA (Registration-Termination-Answer) to the HSS (step E5).

Upon receiving the RTA, the HSS deletes the subscriber information (CS) of the UE (step E6) and transmits a MAP-Cancel Location Ack to the HLR/AuC (step E7).

In case S3-1, FAP#2 cannot release the subscriber information (CS/PS) of the UE and the subscriber information of the UE is left floating (step E8). As a result, when FAP#2 activates triggering of a 50-minute-period Re-Register transmission to the CSCF and transmits a SIP-Re-Register to the CSCF, the CSCF erroneously recognizes that the UE has moved to the area under control of FAP#2 though the UE is visiting the Macro network.

Furthermore, when the UE moves to the Macro network in the state of B, since the HSS does not manage the subscriber information of the UE, the HSS does not perform processing as in the aforementioned state of A and no processing is performed at all. In this case, as in the case of the state of A, FAP#2 cannot release the subscriber information (CS/PS) of the UE and the subscriber information of the UE is left floating (step E9). As a result, when FAP#2 activates triggering of a 50-minute-period Re-Register transmission to the CSCF and transmits a SIP-Re-Register to the CSCF, the CSCF erroneously recognizes that the UE has moved to the area under control of FAP#2 although the UE is visiting the Macro network. Therefore, in this case S3-1, the CSCF transmits a SIP-NOTIFY to FAP#1, before movement has occurred, releases the subscriber information (CS/PS) of the UE managed by FAP#1, before movement has occurred, and avoids the occurrence of a floating state of FAP#1 in step D1 shown in FIG. 8, and can thereby avoid the aforementioned problem.

<Case S3-2: When UE turns power OFF/ON at FAP#2 in the state of case S3>

Figure 10:
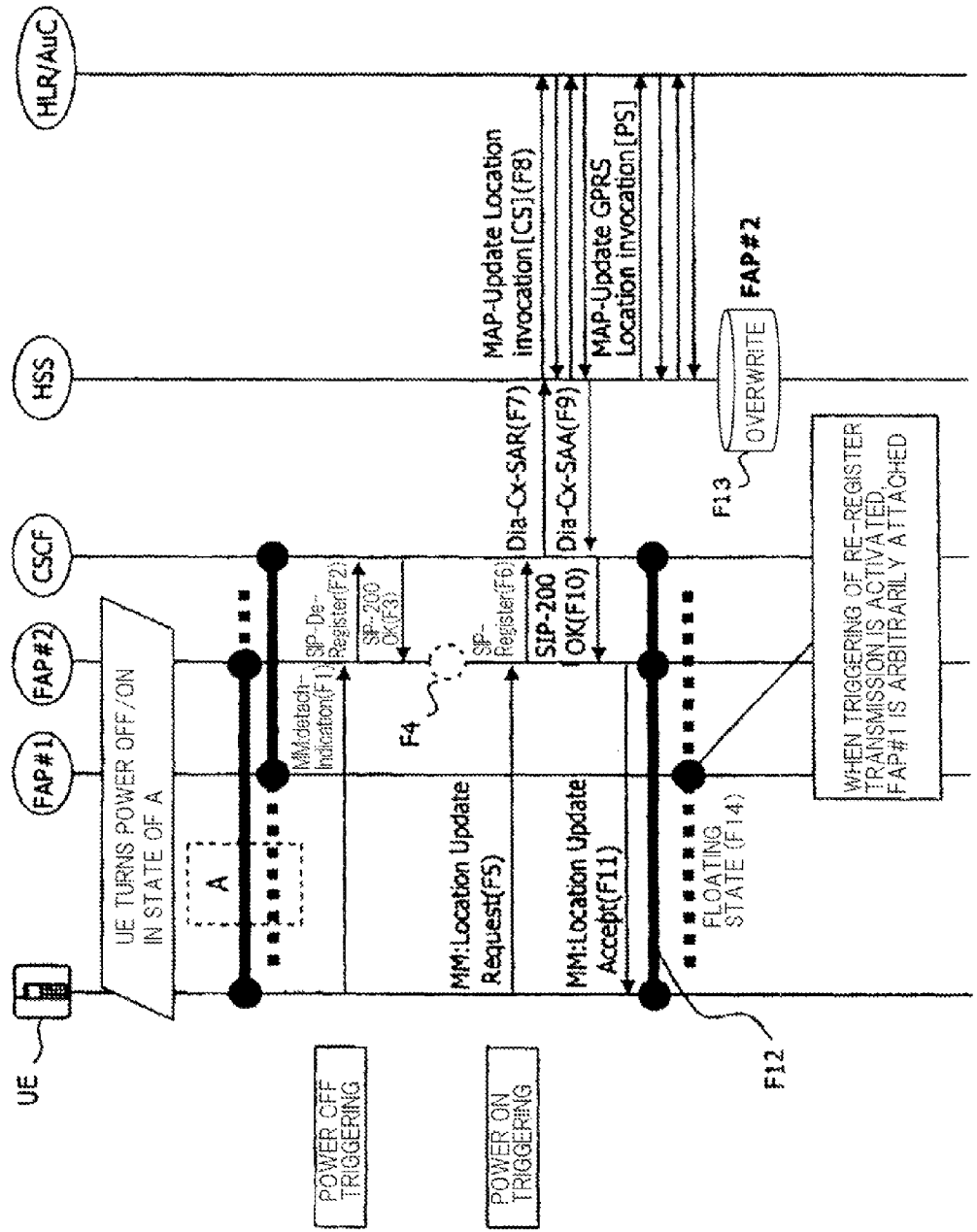
[FIG. 10]

Next, a case where the UE turns power OFF/ON at FAP#2 in the state of case S3 will be described with reference to FIG. 10.

When the power to the UE turns OFF in the state of A, the UE transmits a MM: detach-Indication to FAP#2 (step F1). Upon receiving the detach-Indication, FAP#2 transmits a SIP-De-Register to the CSCF (step F2).

Upon receiving the SIP-De-Register, the CSCF refers to the subscriber information (CS) of the UE managed by the CSCF, judges that a SIP-De-Register with Call ID (FAP#2) that is different from Call ID (FAP#1) of the subscriber information of the UE (Register information of FAP#1) managed in its CSCF has been received and the CSCF transmits a SIP-200 OK to FAP#2 while retaining the subscriber information of the UE (Register information of FAP#1) in its CSCF (step F3).

Upon receiving a SIP-200 OK, FAP#2 releases the subscriber information (CS) of the UE (step F4).

Furthermore, when the power to the UE turns ON, the UE transmits a MM: Location Update Request to FAP#2 (step F5), registers the location of a CS service, and upon receiving Location Update Request, FAP#2 performs processing in steps F6 to F11 between the UE, FAP#2, CSCF, HSS and HLR/Auc and connects between the UE, FAP#2 and CSCF (step F12). Furthermore, the VLR of the HSS manages the subscriber information (CS) of the UE in association with the information of FAP#2 (step F13).

In this case, FAP#1 cannot release the subscriber information (CS/PS) of the UE and the subscriber information of the UE is left floating (step F14). As a result, when FAP#1 activates triggering of a 50-minute-period Re-Register transmission to the CSCF, and transmits a SIP-Re-Register to the CSCF, the CSCF erroneously recognizes that the UE has moved to the area under control of FAP#1 though the UE is visiting the area under control of FAP#2. Therefore, in this case S3-2, the CSCF transmits a SIP-NOTIFY to FAP#1, before movement has occurred, releases the subscriber information (CS/PS) of the UE managed by FAP#1, before movement has occurred, avoids the occurrence of a floating state of FAP#1 in step DI shown in FIG. 8, and can thereby avoid the aforementioned problem.

<Case S3-3: When FAP#2 activates triggering of a 50-minute-period Re-Register transmission to CSCF in the state of case S3>

Figure 11:
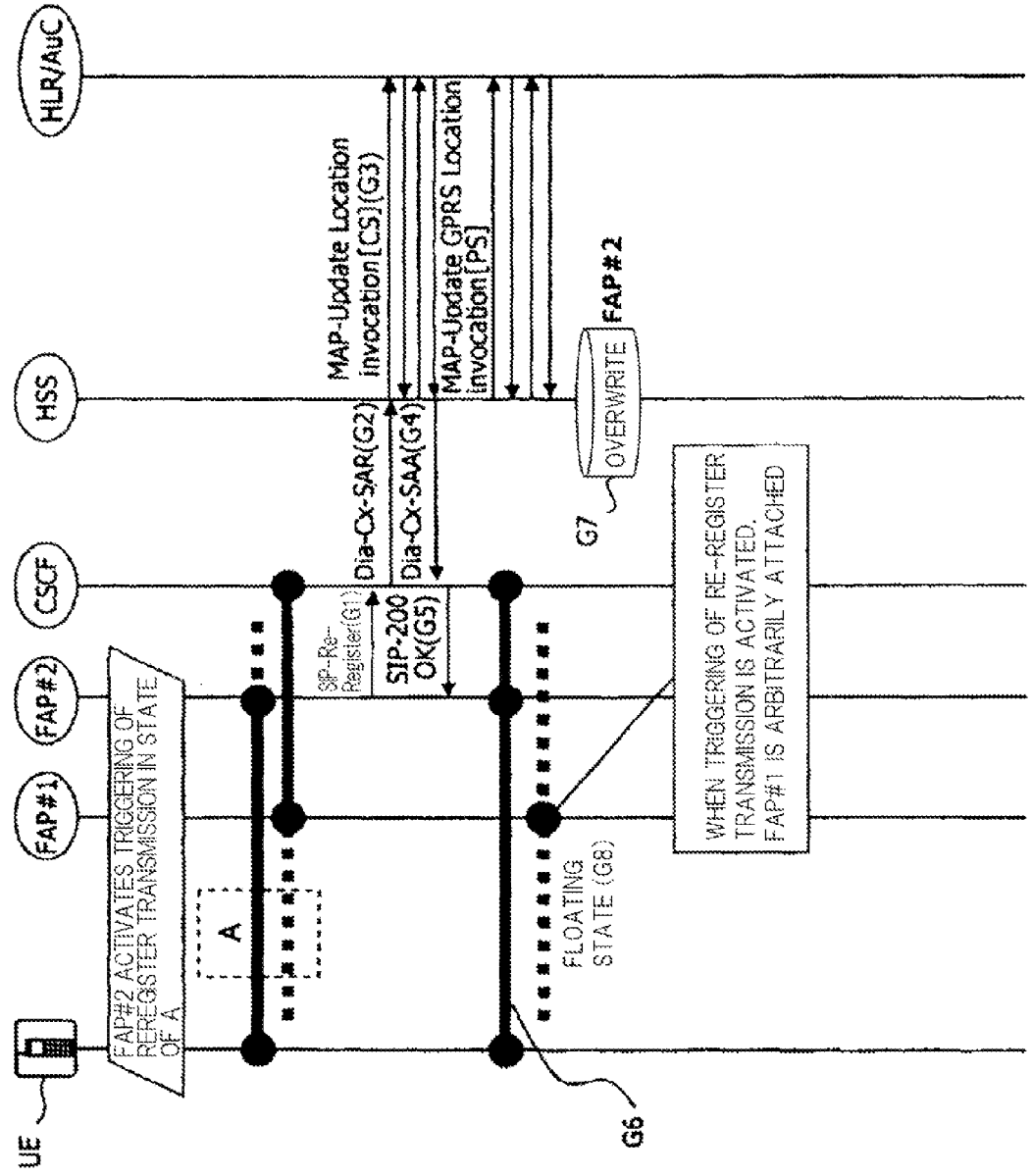
[FIG. 11]

Next, a case will be described with reference to FIG. 11 where FAP#2 activates triggering of a 50-minute-period Re-Register transmission to the CSCF in the state of case S3.

When FAP#2 activates triggering of a 50-minute-period Re-Register transmission to the CSCF in the state of A, FAP#2 transmits a SIP-Re-Register to the CSCF (step G1). Upon receiving the SIP-Re-Register, the CSCF performs processing in steps G2, to G5 between FAP#2, CSCF, HSS and HLR/AuC and connects between the UE, FAP#2 and CSCF (step G6). Furthermore, the VLR of the HSS manages the subscriber information (CS) of the UE in association with the information of FAP#2 (step G7).

In this case, FAP#1 cannot release the subscriber information (CS/PS) of the UE and the subscriber information of the UE is left floating (step G8). As a result, if FAP#1 activates triggering of a 50-minute-period Re-Register transmission to the CSCF and transmits a SIP-Re-Register to the CSCF, the CSCF erroneously recognizes that the UE has moved to the area under control of FAP#1 though the UE is visiting the area under control of FAP#2. Thus, in this case S3-3, the CSCF transmits a SIP-NOTIFY to FAP#1, before movement has occurred, releases the subscriber information (CS/PS) of the UE managed by FAP#1, before movement has occurred, avoids the occurrence of a floating state of FAP#1 in step D1 shown in FIG. 8, and can thereby avoid the aforementioned problem.

<Case S3-4: When UE carries out a CS transmission (SMS transmission) in the state of case S3>

Figure 12:
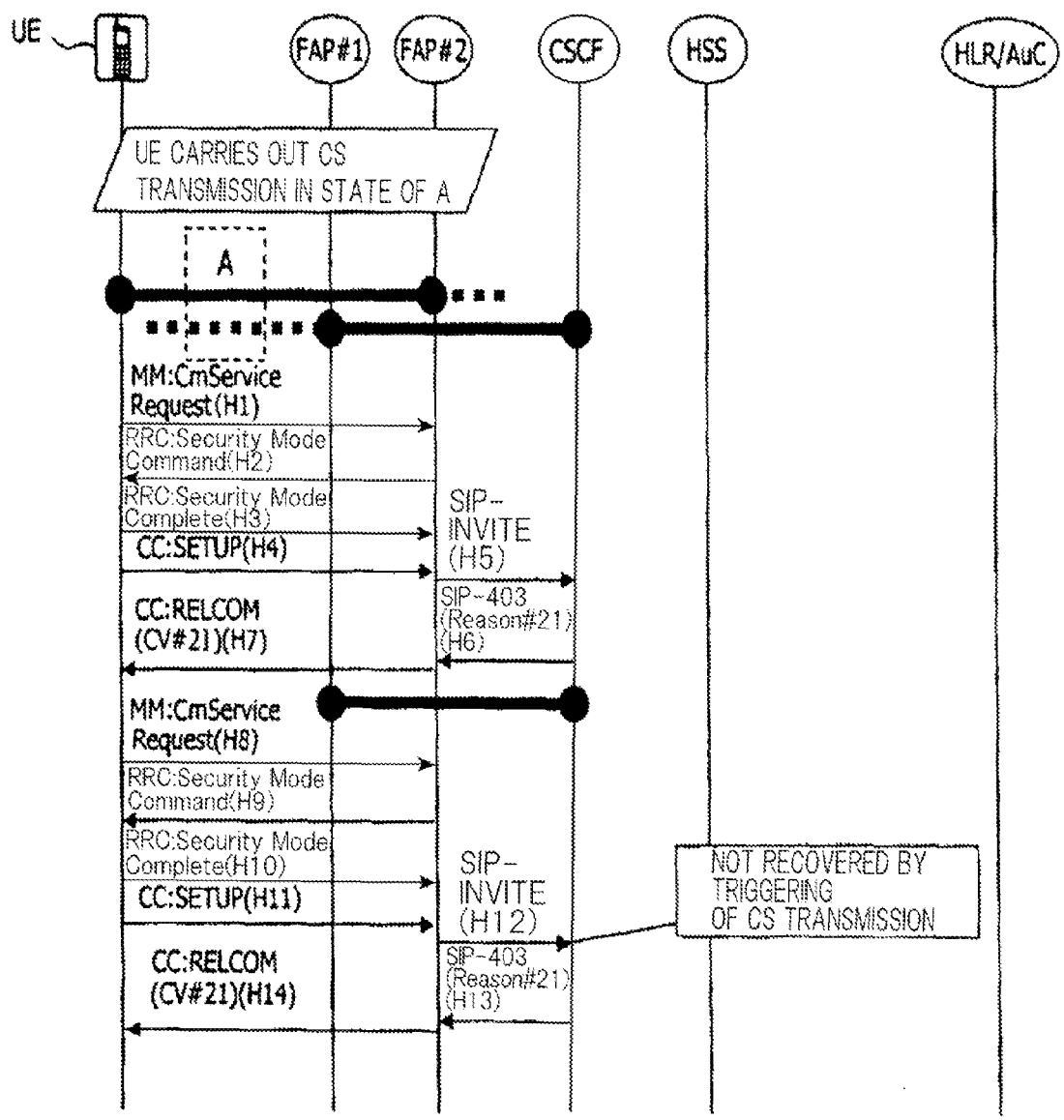
[FIG. 12]

Next, a case will be described with reference to FIG. 12 where the UE carries out a CS transmission (SMS transmission) in the state of case S3.

When the UE carries out a CS transmission in the state of A, the UE transmits a CmService Request to FAP#2 (step H1).

Upon receiving the CmService Request, FAP#2 transmits a Security Mode Command to the UE (step H2).

Upon receiving Security Mode Command, the UE transmits a Security Mode Complete to FAP#2 (step H3).

Next, the UE transmits a SETUP to FAP#2 (step H4) and FAP#2 transmits a SIP-INVITE to the CSCF upon receiving the SETUP (step H5).

Upon receiving the SIP-INVITE, the CSCF refers to the subscriber information of the UE (CS) managed by the CSCF, judges that the SIP-INVITE with Call ID (FAP#2) that is different from Call ID (FAP#1) of the subscriber information of the UE (Register information of FAP#1) managed in the own CSCF has been received and the CSCF transmits a SIP-403 (Reason #21) to FAP#2 (step H6).

Upon receiving the SIP-403 (Reason #21), FAP#2 transmits a RELCOM (CV#21) to the UE (step H7).

Upon receiving the RELCOM (CV#21), the UE performs a CS transmission again, but the UE receives the RELCOM (CV#21) from FAP#2 (step H14). Therefore, in this case S3-4, the CSCF transmits a SIP-NOTIFY to FAP#1, before movement has occurred, releases the subscriber information (CS/PS) of the UE managed by FAP#1 before movement, avoids the occurrence of a floating state of FAP#1 in step D1 shown in FIG. 8, and can thereby avoid the aforementioned problem.

Figure 8:
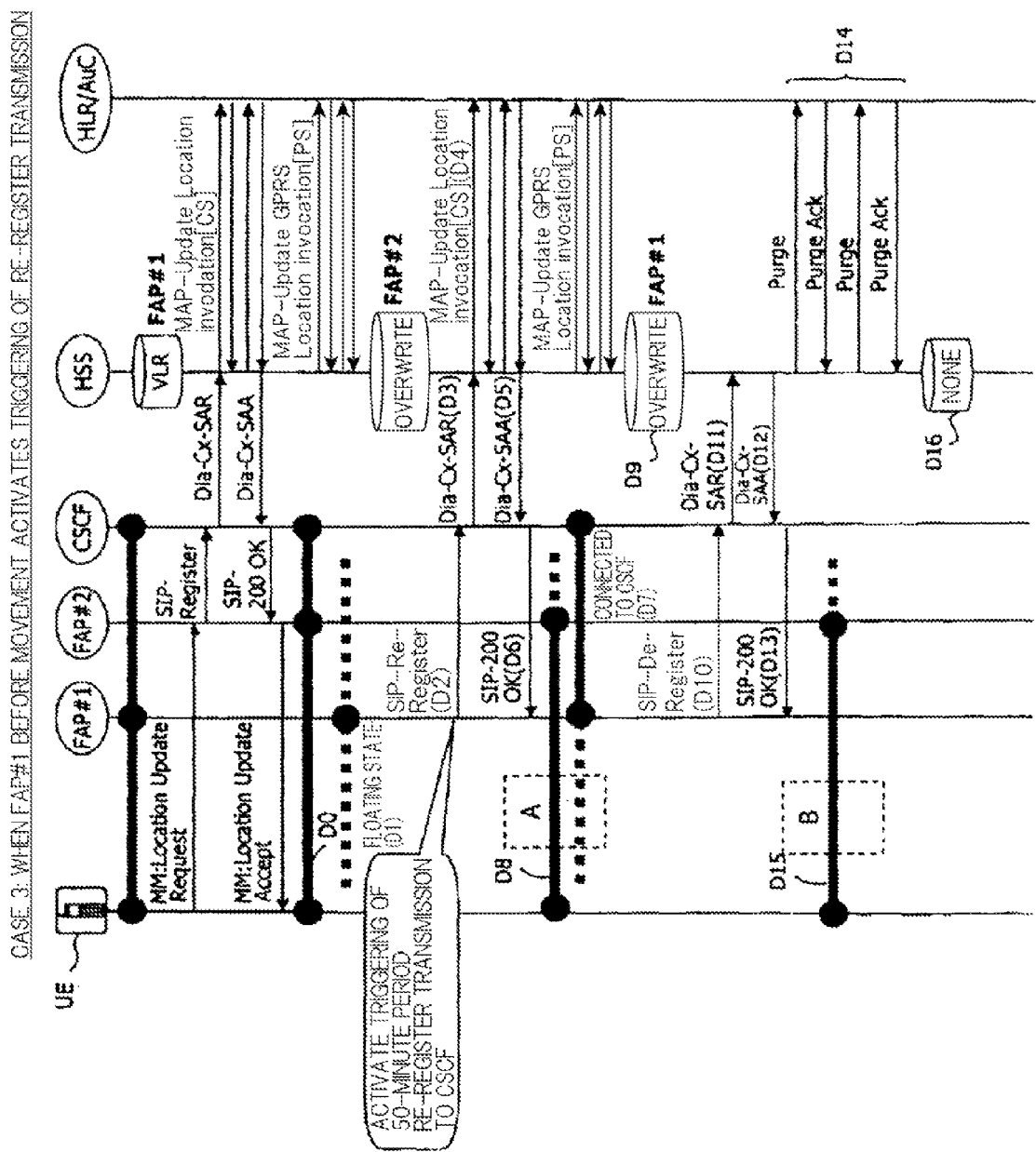
[FIG. 8]

Thus, in case S3, when the CSCF transmits SIP-NOTIFY to FAP#1, before movement has occurred, releases the subscriber information (CS/PS) of the UE managed by FAP#1, before movement has occurred, avoids the occurrence of a floating state of FAP#1 in step D1 shown in FIG. 8, and can thereby avoid the aforementioned problems in case S3-1 to case S3-4.

<Case S4: After UE moves from a state in which the UE is visiting an area under control of FAP#1 to an area under control of FAP#2, the UE moves to a Macro network before cases S1 to S3 occur>

Figure 13:
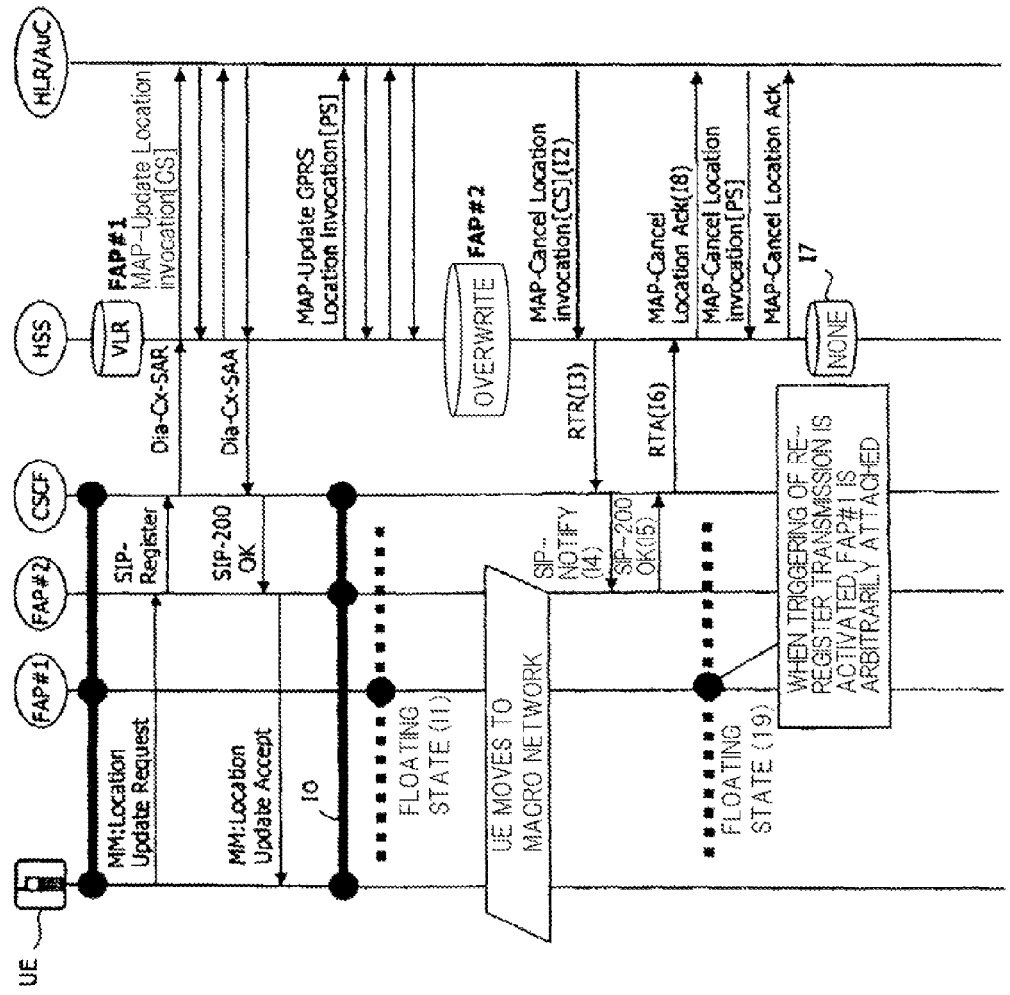
[FIG. 13]

Next, a case will be described with reference to FIG. 13 where after the UE moves from a state in which the UE is visiting the area under control of FAP#1 to the area under control of FAP#2, the UE moves to the Macro network before cases S1 to S3 occur.

When the UE visits the area under control of FAP#2 from a state in which the UE is visiting the area under control of FAP#1, the UE, FAP#2 and CSCF are connected (step 10). In this case, when the CSCF did not transmit SIP-NOTIFY to FAP#1 before movement occurred, the subscriber information (CS/PS) of the UE managed by FAP#1 could not be released and the subscriber information (CS/PS) of the UE was left floating (step 11).

When the UE moves to the Macro network in this state, the HLR/AuC transmits a MAP-Cancel Location invocation[CS] to the HSS (step 12). Upon receiving the MAP-Cancel Location invocation[CS], the HSS transmits a RTR (Registration-Termination-Request) to the CSCF (step 13).

Upon receiving the RTR, the CSCF transmits a SIP-NOTIFY to FAP#2 (step 14).

Upon receiving the SIP-NOTIFY, FAP#2 deletes the subscriber information (CS) of the UE, releases the connection to the CSCF and transmits a SIP-200 OK to the CSCF (step 15).

Upon receiving a SIP-200 OK, the CSCF transmits an RTA (Registration-Termination-Answer) to the HSS (step 16).

Upon receiving the RTA, the HSS deletes the subscriber information (CS) of the UE (step 17) and transmits a MAP-Cancel Location Ack to the HLR/AuC (step 18).

In this case, FAP#1 cannot release the subscriber information (CS/PS) of the UE and the subscriber information of the UE is left floating (step 19). As a result, when FAP#1 activates triggering of a 50-minute-period Re-Register transmission to the CSCF and transmits a SIP-Re-Register to the CSCF, the CSCF erroneously recognizes that the UE has moved to the area under control of FAP#1 though the UE is visiting the Macro network. Thus, in this case S4, the CSCF transmits a SIP-NOTIFY to FAP#1, before movement has occurred, releases the subscriber information (CS/PS) of the UE managed by FAP#1, before movement has occurred, avoids the occurrence of a floating state of FAP#1 in step 11, and can thereby avoid the aforementioned problem.

<Operations and Effects of the Communication System of Present Exemplary Embodiment>

Thus, when the CSCF judges that the UE has moved from a state in which the UE is visiting an area under control of FAP#1 to the visiting area under control of FAP#2, the communication system of the present exemplary embodiment transmits a SIP-NOTIFY to FAP#1, before movement has occurred, and releases the subscriber information (CS/PS) of the UE managed by FAP#1, before movement has occurred. Thus, it is possible to change the subscriber information (CS/PS) of the UE managed by FAP#1 and FAP#2 according to the visiting position of the UE, and it is possible that FAP#1, before movement has occurred, can release the subscriber information (CS/PS) of the UE, and a situation can thereby be avoided in which FAP#1 transmits a 50-minute-period Re-Register to the CSCF. As a result, the CSCF can avoid misrecognition of the FAP the UE is visiting. As a result, it is possible to avoid the problems in case S2 to case S4.

Furthermore, when FAP#1, before movement occurs, judges through non-communication monitoring for a 6-minute period that the UE is not visiting, FAP#1 transmits a SIP-De-Register to the CSCF. Upon receiving the SIP-De-Register, the CSCF refers to the subscriber information (CS) of the UE managed by the CSCF, transmits a SIP-200 OK to FAP#1, before movement has occurred, upon receiving the SIP-De-Register with Call ID (FAP#1) that is different from the Call ID (FAP#2) of the subscriber information of the UE (Register information of FAP#2) managed in its CSCF, and FAP#1, before movement has occurred, releases the subscriber information (CS/PS) of the UE upon receiving the SIP-200 OK from the CSCF. This allows FAP#1, before movement has occurred, to release the subscriber information (CS/PS) of the UE and a situation can thereby be avoided in which FAP#1 transmits a 50-minute-period Re-Register to the CSCF. As a result, the CSCF can avoid misrecognition of the FAP the UE is visiting.

The above described exemplary embodiment is an exemplary embodiment, the scope of the present invention is not limited to the above described exemplary embodiment alone and various modifications can be made without departing from the spirit and scope of the present invention.

For example, a case has been described in the above described exemplary embodiment assuming that the FAP transmits a 6-minute-period De-Register and a 50-minute-period Re-Register to the CSCF. However, the 6-minute-period and 50-minute-period are merely examples and the period can be set or changed arbitrarily. However, even if the period is set or changed arbitrarily, the De-Register period and the Re-Register period become asynchronous with each other, and therefore it goes without saying that the CSCF on the core network side may erroneously recognize the FAP that the UE is visiting. Furthermore, even if the De-Register period and the Re-Register period are synchronized, since the De-Register period cannot be set or changed to less than six minutes, it goes without saying that the CSCF on the core network side may erroneously recognize the FAP that the UE is visiting.

Figure 3:
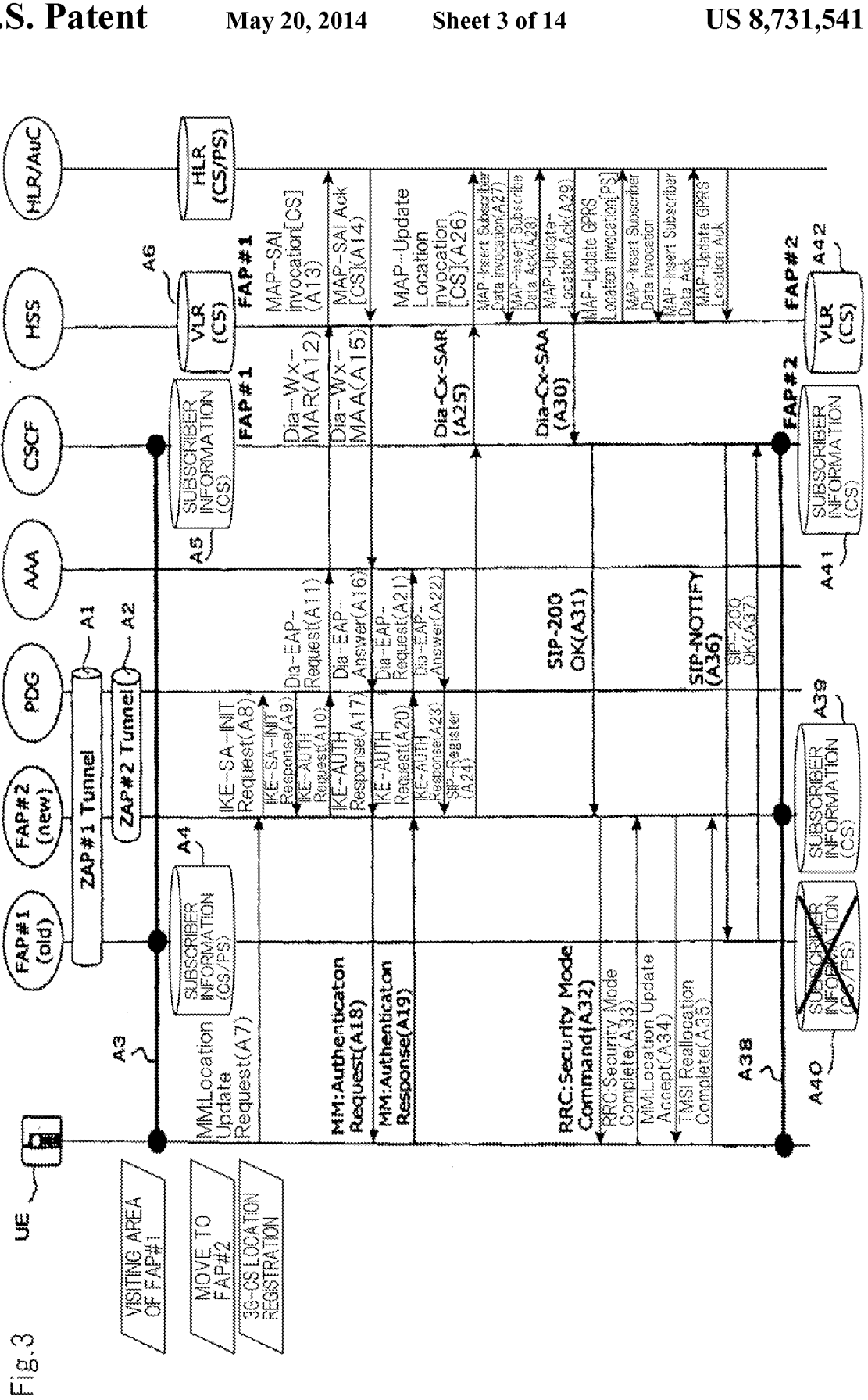
[FIG. 3]
Figure 4:
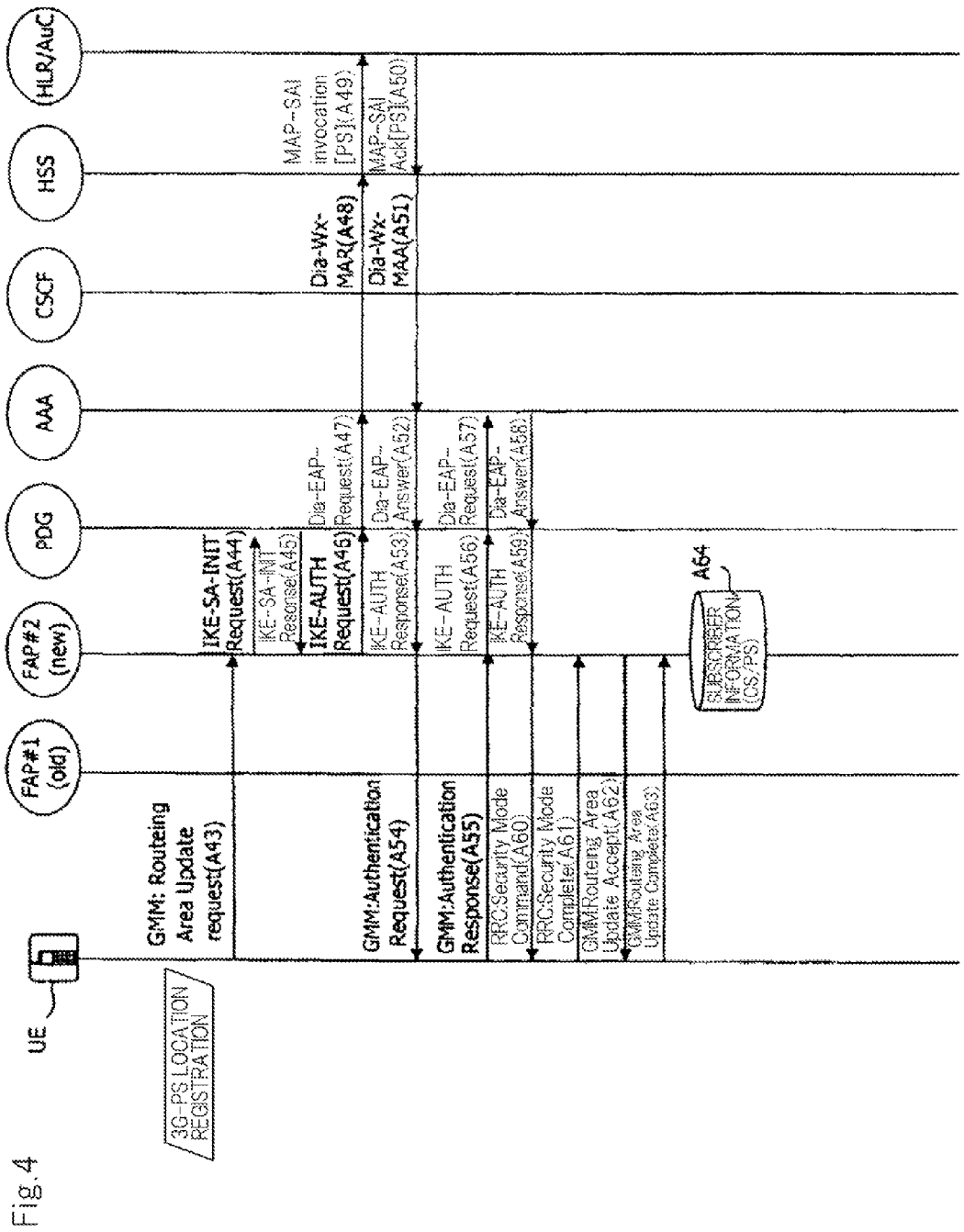
[FIG. 4]

Furthermore, according to the processing operation shown in FIG. 3 and FIG. 4, after transmitting a SIP-200 OK to FAP#2, after movement has occurred, the CSCF transmits a SIP-NOTIFY to FAP#1, before movement has occurred, but it is also possible to transmit a SIP-NOTIFY to FAP#1, before movement has occurred, and then transmit a SIP-200 OK to FAP#2, after movement has occurred.

Furthermore, the communication system according to the present exemplary embodiment can perform processing independently of Version of 3GPP.

Figure 14:
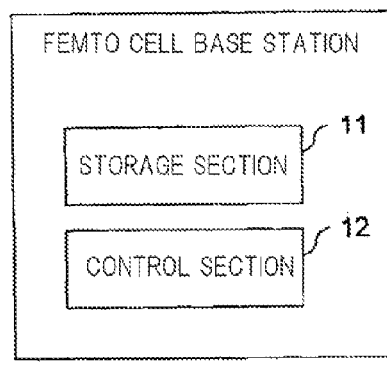
[FIG. 14]

FIG. 14 is a block diagram illustrating a schematic function configuration of a femto cell base station. Referring to FIG. 14, the femto cell base station is provided with storage section 11 and control section 12.

Storage section 11 stores subscriber information of a UE visiting an area under control of the femto cell base station. Control section 12 deletes subscriber information of the UE, which moves away from the area under control of the femto cell base station, from storage section 11.

Upon accepting a deletion request of the subscriber information of the UE registered with storage section 11, control section 12 may delete the subscriber information of the UE corresponding to the deletion request from storage section 11.

Furthermore, when there is a UE which is not visiting the area under control of the femto cell base station in the subscriber information of the UE retained in storage section 11, control section 12 may transmit the deletion request of the subscriber information of the UE to the core network side and may delete, when the deletion request from the core network side is accepted, the subscriber information of the UE from storage section 11.

Figure 15:
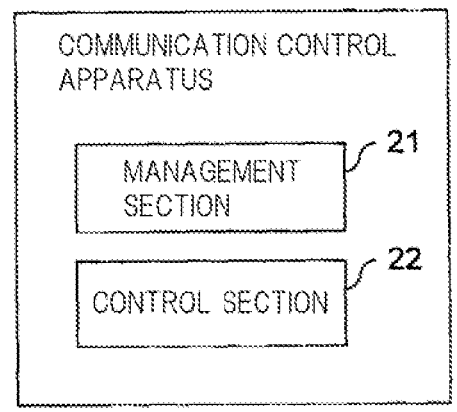
[FIG. 15]

FIG. 15 is a block diagram illustrating a schematic function configuration of a communication control apparatus that communicates with the femto cell base station.

Referring to FIG. 15, the communication control apparatus is provided with management section 21 and control section 22. Management section 21 manages a visiting state of a UE under control of a plurality of femto cell base stations.

When control section 22 judges, based on a visiting state managed by management section 21, that a UE visiting an area under control of a first femto cell base station has moved to an area under control of a second femto cell base station, control section 22 performs processing for deleting subscriber information of the UE managed by the first femto cell base station. In that case, control section 22 may transmit a deletion request for deleting the subscriber information to the first femto cell base station as a processing operation to delete the subscriber information of the UE managed by the first femto cell base station.

Furthermore, management section 21 may manage a plurality of femto cell base stations in association with subscriber information of the UE visiting areas under control of the plurality of femto cell base stations respectively.

Upon accepting a location registration request of a UE from a second femto cell base station that is different from a first femto cell base station associated with subscriber information of the UE managed by management section 21, control section 22 may also judge that the UE has moved from a state in which the UE is visiting an area under control of the first femto cell base station to a state in which the UE is visiting an area under control of the second femto cell base station.

Furthermore, control section 22 may also transmit a location registration request of a UE to a higher network (core network side) and associate, upon accepting a response to the location registration request of the UE from the higher network, the subscriber information of the UE managed by management section 21 with the second femto cell base station and transmit a deletion request for deleting the subscriber information of the UE to the first femto cell base station.

Furthermore, upon accepting a deletion request of the subscriber information of the UE from the first femto cell base station that is different from the second femto cell base station associated with the subscriber information of the UE managed by management section 21, control section 22 may also transmit a response of accepting the deletion request to the first femto cell base station.

Furthermore, the control operation in each apparatus making up the communication system according to the aforementioned present exemplary embodiment may also be executed using hardware, software or a configuration combining both.

When an executing processing operation using software, it is possible to install and execute a program recording a processing sequence in the memory in a computer incorporated in dedicated hardware. Alternatively, it is also possible to install and execute a program in a general-purpose computer capable of executing various types of processing.

For example, the program may be recorded in a hard disk or ROM (Read Only Memory) beforehand as a recording medium. Alternatively, the program may be temporarily or permanently stored (recorded) in a removable recording medium. Such a removable recording medium may be provided as so-called package software. Examples of removable recording medium include a floppy (registered trademark) disk, CD-ROM (Compact Disc Read Only Memory), MO (Magneto optical) disk, DVD (Digital Versatile Disc), magnetic disk and semiconductor memory.

The program may be installed in the computer from the aforementioned removable recording medium. Furthermore, the program may be transferred wirelessly to the computer from a download site. Furthermore, the program may be transferred to the computer via a network using a cable.

Furthermore, the communication system according to the present exemplary embodiment may also be constructed so as to execute a processing operation not only in time-sequence according to the processing operation described in the above described exemplary embodiment but also according to the processing capacity of the apparatus that executes processing in parallel or individually as required.

Furthermore, the communication system according to the present exemplary embodiment may also have a logical combined configuration of a plurality of apparatuses or may be constructed such that apparatuses in different configurations exist in the same housing.

The invention claimed is:

1. A femto cell base station, comprising:
   a storage device that is configured to store subscriber information regarding a User Equipment (UE) within an area under control of the femto cell base station; and
   a control device that is configured to receive, from a device that is in communication with at least one other femto cell base station, a request to delete the subscriber information, and is further configured to delete the subscriber information from the storage device based, at least in part, on the received request.

2. The femto cell base station according to claim 1, wherein the control device is configured to transmit, when the UE is not within an area under control of the femto cell base station, a deletion request of the subscriber information to a core network side and to delete, when the deletion request is accepted from the core network side, the subscriber information from the storing device.

3. A communication control apparatus that carries out communication with a plurality of femto cell base stations, comprising:
   manager that is configured to manage a visiting state of a User Equipment (UE) under control of the plurality of femto cell base stations; and
   a controller that is configured , upon determining that the UE has moved to an area under control of a second femto cell base station, to transmit to a first femto cell base station a request to delete subscriber information regarding the UE stored by the first femto cell base station.

4. The communication control apparatus according to claim 3, wherein the manager is configured to manage the plurality of femto cell base stations in based, at least in part, on the subscriber information.

5. The communication control apparatus according to claim 4, wherein the controller is configured to determine, upon accepting a location registration request of the UE from the second femto cell base station that is different from the first femto cell base station, that the UE has moved from within an area under control of the first femto cell base station to within an area under control of the second femto cell base station.

6. The communication control apparatus according to claim 5, wherein the controller is configured to transmit the location registration request of the UE to a higher network, to associate, upon accepting a response to the location registration request of the UE from the higher network, the subscriber information with the second femto cell base station, and to transmit a deletion request for deleting the subscriber information to the first femto cell base station.

7. The communication control apparatus according to claim 4, wherein the controller is configured to transmit, upon accepting the deletion request of the subscriber information from the first femto cell base station that is different from the second femto cell base station, a response accepting the deletion request to the first femto cell base station.

8. A communication system comprising:
a femto cell base station that is configured to connect a User Equipment (UE) to a core network side; and
a communication control apparatus that is configured to manage visiting state of the UE,
wherein the femto cell base station is further configured to store subscriber information regarding the UE within an area under control of the femto cell base station, to receive. from the communication control apparatus, a request to delete the subscriber information, and to delete the subscriber information based, at least in part, on the received request.

9. A control method carried out by a femto cell base station, comprising:
retaining subscriber information UE regarding a User Equipment (UE) within an area under control of the femto cell base station;
receiving, from a device that is in communication with at least one other femto cell base station, a request to delete the subscriber information; and
deleting the subscriber information based, at least in part, on the received request.

10. A control method carried out by a communication control apparatus that communicates with a plurality of femto cell base stations, comprising:
managing a visiting state of a User Equipment (UE) under control of the plurality of femto cell base stations; and
transmitting, upon determininq that the UE has moved to an area under control of a second femto cell base station, to a first femto cell base station, a request to delete subscriber information regarding the UE stored by the first femto cell base station.

11. A non-transitory computer-readable medium containing a program to be executed by a computer of a femto cell base station configuring the computer to:
store subscriber information regarding a User Equipment (UE) within an area under control of the femto cell base station;
receive, from a device that is in communication with at least one other femto cell base station, request to delete the subscriber information; and
delete the subscriber information based, at least in part, on the received request.

12. A non-transitory computer readable medium containing a program to be executed by a computer of a communication control apparatus that communicates with a plurality of femto cell base stations configuring the computer to:
manage a visiting state of a User Equipment (UE) under control of the plurality of femto cell base stations; and
transmit, upon determining that the UE has moved to an area under control of a second femto cell base station, to a first femto cell base station, a request to delete subscriber information regarding the UE stored by the first femto cell base station.

13. The communication system according to claim 8, wherein the femto cell base station is configured to transmit, when the UE is not within an area under control of the femto cell base station, a deletion request of the subscriber information to a core network side and to delete, when the deletion request is accepted from the core network side, the subscriber information from a storage device.

14. The control method according to claim 9, further comprising transmitting, when the UE is not within an area under control of the femto cell base station, a deletion request of the subscriber information to a core network side, and deleting, when the deletion request is accepted from the core network side, the subscriber information.

15. The control method according to claim 10, further comprising determining, upon accepting a location registration request of the UE from the second femto cell base station that is different from the first femto cell base station, that the UE has moved from within an area under control of the first femto cell base station to within an area under control of the second femto cell base station.

16. The non-transitory computer-readable medium according to claim 11 wherein the program further configures the computer to transmit, when the UE is not within an area under control of the femto cell base station, a deletion request of the subscriber information to a core network side, and to delete, when the deletion request is accepted from the core network side, the subscriber information.

17. The non-transitory computer-readable medium according to claim 12, wherein the program further configures the computer to determine, upon accepting a location registration request of the UE from the second femto cell base station that is different from the first femto cell base station, that the UE has moved from within an area under control of the first femto cell base station to within an area under control of the second femto cell base station.

* * * * *